(12) United States Patent
Owechko et al.

(10) Patent No.: US 7,636,700 B2
(45) Date of Patent: Dec. 22, 2009

(54) OBJECT RECOGNITION SYSTEM INCORPORATING SWARMING DOMAIN CLASSIFIERS

(75) Inventors: Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 774 days.

(21) Appl. No.: 10/918,336

(22) Filed: Aug. 14, 2004

(65) Prior Publication Data

US 2005/0196047 A1 Sep. 8, 2005

Related U.S. Application Data

(60) Provisional application No. 60/541,557, filed on Feb. 3, 2004.

(51) Int. Cl.
*G06F 17/00* (2006.01)
*G06N 5/02* (2006.01)
*G06K 9/00* (2006.01)
*G06K 9/34* (2006.01)
*G06K 9/62* (2006.01)

(52) U.S. Cl. .......................... 706/46; 382/115; 382/173; 382/224

(58) Field of Classification Search .................. 706/14, 706/46; 352/115, 173, 224
See application file for complete search history.

(56) References Cited

U.S. PATENT DOCUMENTS

2003/0142851 A1* 7/2003 Brueckner et al. .......... 382/107

OTHER PUBLICATIONS

Eberhart, Russel. Shi, Yuhui. "Particle Swarm Optimization: Developments, Applications, and Resources" IEEE, 2001, p. 81-86.*

(Continued)

*Primary Examiner*—Wilbert L. Starks, Jr.
*Assistant Examiner*—Ben M Rifkin
(74) *Attorney, Agent, or Firm*—Tope-McKay & Assoc.

(57) ABSTRACT

The present invention relates to a system, method, and computer program product for recognition objects in a domain which combines feature-based object classification with efficient search mechanisms based on swarm intelligence. The present invention utilizes a particle swarm optimization (PSO) algorithm and a possibilistic particle swarm optimization algorithm (PPSO), which are effective for optimization of a wide range of functions. PSO searches a multi-dimensional solution space using a population of "software agents" in which each software agent has its own velocity vector. PPSO allows different groups of software agents (i.e., particles) to work together with different temporary search goals that change in different phases of the algorithm. Each agent is a self-contained classifier that interacts and cooperates with other classifier agents to optimize the classifier confidence level. By performing this optimization, the swarm simultaneously finds objects in the scene, determines their size, and optimizes the classifier parameters.

36 Claims, 17 Drawing Sheets

OTHER PUBLICATIONS

Bhanu, Blr. Lee, Sungkee. Ming. John. "Adaptive Image Segmentation Using a Genetic Algorithm." IEEE Transactions on Systems, Man, and Cybernetics, vol. 25, No. 12, Dec. 1995. p. 1543-1567.*

R. C. Eberhart and Y. Shi, "Particle Swaim Optimization: Developments, Applications, and Resources," 2001.

D. L. Swets, B. Punch, and J. Weng, Genetics Algorithms for Object Recognition in a complex scene, Proc. of Intl. Conference on Image Processing, vol. 2. October, pp. 23-26, 1995.

R. Krishnapuram and J. M. Keller. Quantative Analysis of Properties and Spatial Relations of Fuzzy Image Regions. Transactions on Fuzzy Systems, 1(2):98-110, 1993.

V. Ciesielski and M. Zhang, Using Genetic Algorithms to Improve the Accuracy of Object Detection, In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., Eberhart, R. C., and Shi, Y., Swarm Intelligence San Francisco: Morgan Kaufmann Publishers, 2001.

R. Brits, A. P. Engelbrecht, and F. van den Bergh, "A Niching Particle Swarm Optimizer," 2002.

D. Beasley, D. R. Bull, and R. R. Martin, "A Sequential Niching Technique for Multimodal Function Optimization," Evolutionary Computation, 1(2), p. 101-125, 1993.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. Of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

G. Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

J.C. Bezdek, Pattern Recognition with Fuzzy Objective Function Algorithms, Plenum Press, New York, 1981.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling Human Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

F. Rojas, I. Rojas, R. M. Clemente, and C.G. Puntoner, "Nonlinear blind source separation using genetic algorithms," in Proceedings of International Conference on Independent Component Analysis, 2001.

Y. Owechko, et al., "Vision-Based occupant sensing and recognition for intelligent airbag systems," submitted to IEEE Trans. On Intelligent Transportation Systems, 2003.

Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. On Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.

F. van der Bergh, et al., "A Cooperative Approach to Particle Swarm Optimization," Special issue of IEEE Trans. On Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.

C.A. Coello, "Handling Multiple Objectives With Particle Swarm Optimization," Special issue of IEEE Trans. On Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

* cited by examiner

| Conventional Scanning | Particle Swarm |
|---|---|
| Wavelet size = $M \times N$ | No. of Particles = $P$ |
| Image size = $M \times M$ | No. of Iterations = $K$ |
| No. of Features = $F$ | No. of Features = $F$ |
| Operations per feature = $2M(N-2)$ | Operations per feature = $2M(N-2)$ |
| Total complexity per image = $M^2 * F * 2 * M(N-2)$ | Total complexity per image = $P * K * F * 2 * M(N-2)$ |
| (Assumes that complete image is scanned to find objects of interest, stepsize = 1 pixel) | (Note that $P*K << M^2$) |

FIG. 2

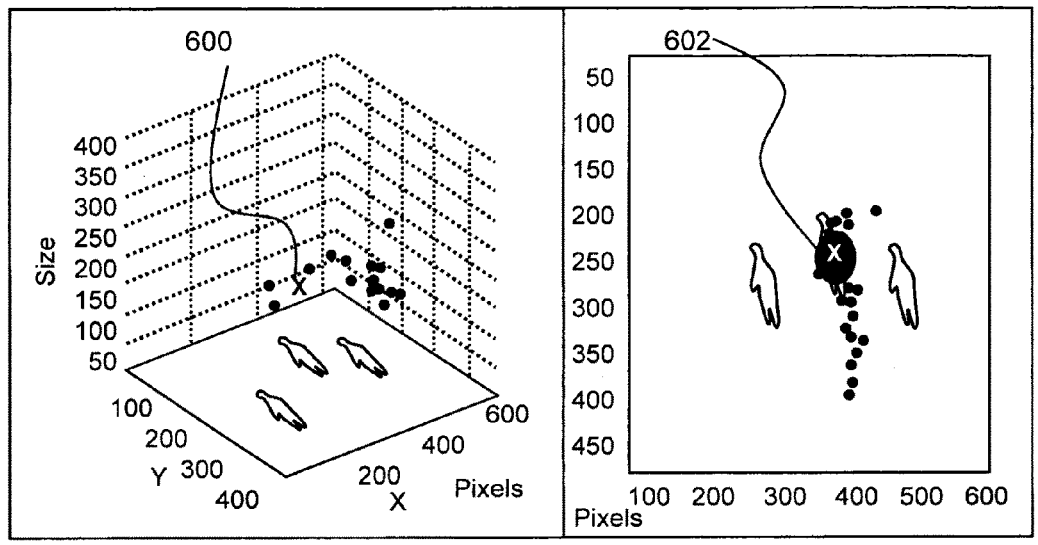
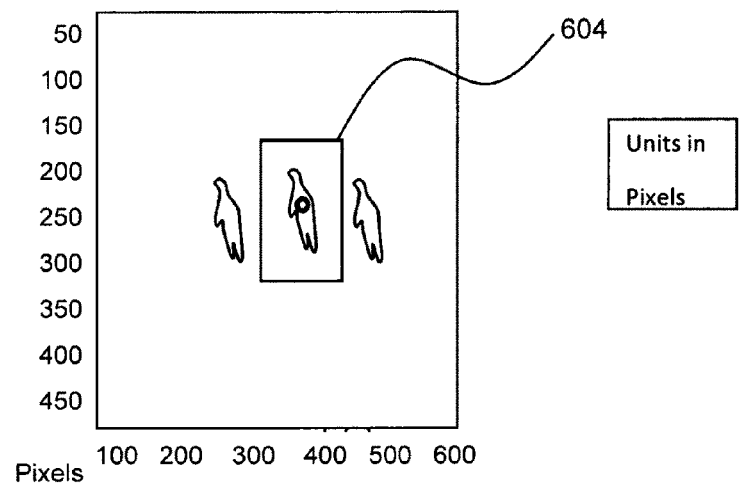
FIG. 6

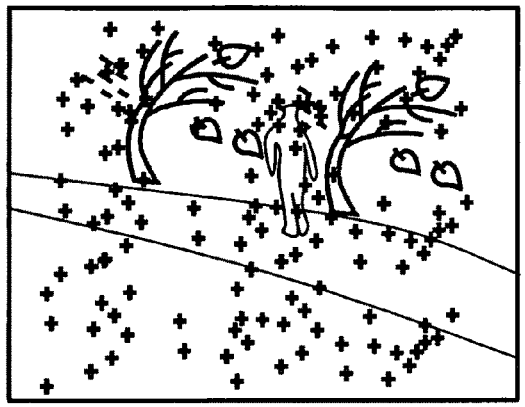
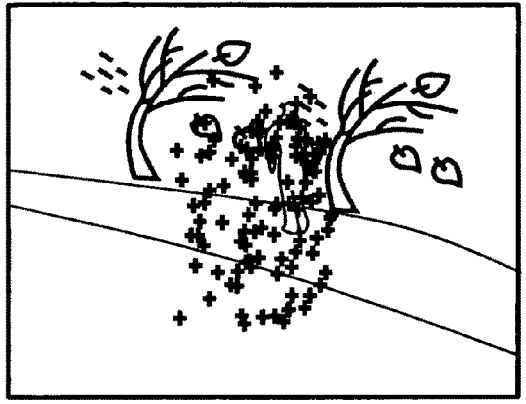
FIG. 15A                    FIG. 15B
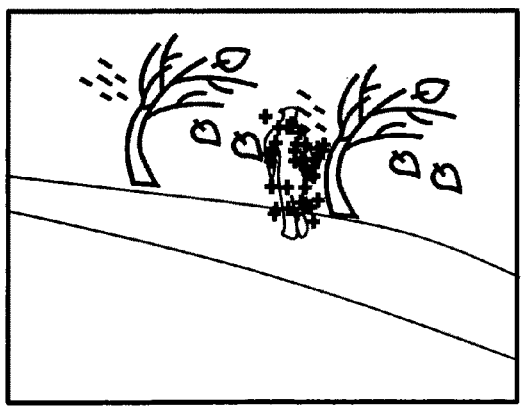
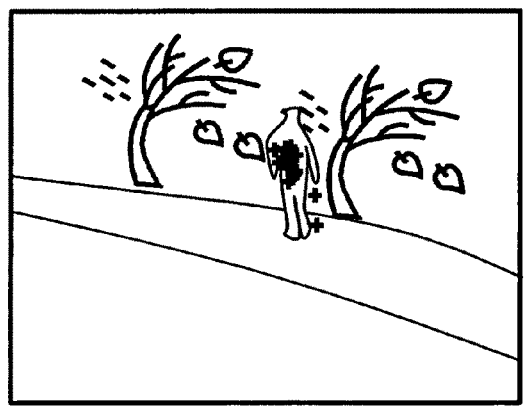
FIG. 15C                    FIG. 15D

OBJECT RECOGNITION SYSTEM INCORPORATING SWARMING DOMAIN CLASSIFIERS

PRIORITY CLAIM

This application is a non-provisional application, claiming the benefit of priority to provisional application No. 60/541,557, filed in the United States on Feb. 3, 2004, entitled, "Object Recognition Using Swarming Image Classifiers."

FIELD OF INVENTION

The present invention relates to an object recognition system, and more particularly, to a system for visual recognition objects in a domain which combines feature-based object classification with search mechanisms based on swarm intelligence.

BACKGROUND OF INVENTION

Typically, classificatioN objects in a domain is performed using features extracted from an analysis window which is scanned across the domain, known as a sequential search. A sequential search can be very computationally intensive, especially if a small window is used since a classification must be performed at each window position. Conventional approaches to reduce the computational load in the visual image domain are based on reducing the search space by using another sensor such as radar to cue the vision system and measure the range of the object. Limitations of the radar approach include high cost, false alarms, the need to associate radar tracks with visual objects, and overall system complexity. Alternatively, previous vision-only approaches have utilized motion-based segmentation using background estimation methods to reduce the search space by generating areas of interest (AOI) around moving objects and/or using stereo vision to estimate range in order to reduce searching in scale. This method adds cost and complexity by requiring additional cameras and computations. Motion-based segmentation is also problematic under challenging lighting conditions or if background motion exists as is the case for moving host platforms.

Additionally, there have been attempts to use Genetic Algorithms (GAs) and Evolutionary Algorithms for object detection. Genetic algorithms have been used before for decreasing the search space in vision systems. These systems employ a population of individual solutions that crossover and mutate in an effort to maximize the fitness function. Other efforts have used GAs for training and adapting neural networks to recognize objects. However, all of the currently available methods are computationally costly, and largely ineffective.

Thus, a continuing need exists for an effective and efficient object recognition system for classifying objects in a domain.

SUMMARY OF INVENTION

The present invention relates to an object recognition system using swarming domain classifiers. The object recognition system comprises a plurality of software agents configured to operate as a cooperative swarm to classify an object in a domain. Each agent is a complete classifier and is assigned an initial randomized velocity vector to explore a solution space for potential object solutions. Each agent performs at least one iteration, the iteration being a search in the solution space for a potential solution optima where each agent keeps track of its coordinates in multi-dimensional space that are associated with an observed best solution (pbest) that the agent has identified, and a global best solution (gbest). The gbest is used to store the best location among all agents, with each velocity vector thereafter changing towards pbest and gbest, allowing the cooperative swarm to concentrate on the vicinity of the object and classify the object when a classification level exceeds a preset threshold.

In another aspect, each velocity vector changes towards pbest and gbest in a probabilistic way.

In yet another aspect, the plurality of agents constitute a particle swarm optimization module, where the velocity vector changes towards pbest and gbest in a probabilistic way according to the following velocity update technique:

$$v^i(t) = wv^i(t-1) + c_1 * \text{rand}(\ ) * (\text{pbest} - x^i(t-1)) + c_2 * \text{rand}(\ ) * (\text{gbest} - x^i(t-1)) x^i(t) = x^i(t-1) + v^i(t),$$

where $x^i(t)$ and $v^i(t)$ are the position and velocity vectors at time t of the ith agent and $c_1$ and $c_2$ are parameters that weight the influence of their respective terms in the velocity update technique. * denotes multiplication. w is a decay constant, and the rand( ) function generates a random number scaled between 0 and 1. Each agent in the plurality of agents changes its velocity in accordance with a combination of gbest and pbest, thereby allowing the swarm to concentrate in the vicinity of the object to quickly classify the object.

In yet another aspect, the object recognition system further comprises a possibilistic particle swarm optimization module communicatively connected with the particle swarm optimization module for finding multiple objects in the domain. The possibilistic particle swarm optimization module is configured to update agent position and velocity using a possibilistic update technique when the number of iterations is greater than a preset value. Agent velocity in the possibilistic particle swarm optimization module is calculated according to the following:

$$v^i(t) = wv^i(t-1) + c_1 * \text{rand}() * (\text{pbest} - x^i(t-1)) + c_2 * \text{rand}() * \sum_{j=1}^{C} \mu_{ij}(\text{gbest}^j - x^i(t-1)),$$

where $$\mu_{ij} = \frac{\eta_j}{\eta_j + d_{ij}^2}.$$

$\eta_j$ is a dynamic elastic constraint around the jth minima, and $$d_{ij}^2$$

is the distance of the ith agent to the jth minima. Initially $\eta_j$ is unbounded and it is slowly decreased to a small region around the local minima. * denotes multiplication.

In yet another aspect, the object recognition system further comprises a sequential niching module communicatively connected with the particle swarm optimization module, for finding multiple objects in the domain. The sequential niching module is configured to receive an input domain and clear object positions from an object position list and a flag table.

The module thereafter initializes and runs the cooperative swarm until the gbest is greater than a preset value, or a number of iterations has reached a preset maximum number of allowable iterations. If the gbest is not greater than the preset value or the number of iterations has reached a present maximum number, the module receives a next input domain. If the gbest is greater than the preset threshold, the module then runs a neighborhood test around the gbest position to verify if a certain number of neighboring positions in the domain also exceed the preset value. If the gbest passes the neighborhood test, the module then adds the gbest position to the object position list; erases the domain locally at gbest with a predetermined function; updates the flag table; and re-initializes and runs the swarm until gbest is greater than the preset value or the number of iterations has reached a preset maximum number of allowable iterations. If the gbest fails the neighborhood test, the module then re-initializes and runs the swarm until gbest is greater than the preset value or the number of iterations has reached a maximum number of allowable iterations.

In another aspect, the object position list is a list of previously identified objects.

Additionally, the flag table is a table with identical dimensions as the domain and is in a one-to-one correspondence with the domain, where all table entries are initially set to an "OFF" position. When an object is identified and erased from the domain, the corresponding table entry is updated from the "OFF" to an "ON" position. If an agent lands on a location whose flag is set to "ON," the agent will not run its classifier since it is already known that an object is present at that location.

Furthermore, the predetermined function is a function selected from a group consisting of a Gaussian function and a Rect function.

In another aspect, the domain is a searchable domain selected from a group consisting of an image, space, scale, frequency, time, Doppler shift, time delay, wave length, and phase.

In yet another aspect, the object recognition system further comprises a second cooperative swarm configured to search for members of a second object class. Each swarm maintains its own gbest, pbest, and object lists, where the swarms interact indirectly through the erased domain and flag table. If a swarm detects an object at a particular location in the domain, the other swarm does not try to find objects at the particular location.

Furthermore, each agent includes a classifier selected from a group consisting of Haar wavelet, fuzzy symmetry, decision tree, correlators, and a back-propagation neural network classification engine.

In another aspect, the multi-dimensional solution space consists of the dimensions (x, y, z), size, scale, internal classifier parameters, object rotation angle, and time.

Finally, as can be appreciated by one in the art, the present invention is not limited to any one particular technique for object recognition, but can also be incorporated into other aspects such as a method and a computer program product. The other aspects can be configured to perform all of the operations of the object recognition described herein. Additionally, as can be appreciated by one in the art, the plurality of agents can constitute both the possibilistic particle swarm optimization module and the particle swarm optimization module, allowing for different claim chain construction.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is a table illustrating a comparison of computational requirements of particle swarm optimization (PSO) classification compared to sequential scanning;

FIG. 6 is an illustration showing results for a sequential niching PSO vision system for three pedestrians in the infrared spectrum, showing results after a single iteration of the swarm (in this example, only one of the objects has been detected);

FIG. 15A illustrates two-dimensional (2D) results of an original image with an initialized swarm where the PPSO is searching for only the (x,y) location of the human in the scene while operating with a known window size that corresponds to the human in the scene;

FIG. 15B illustrates the swarm of FIG. 15A after ten iterations;

FIG. 15C illustrates the swarm of FIG. 15B after 20 iterations;

FIG. 15D illustrates the swarm of FIG. 15C after convergence on the object (i.e., human);

DETAILED DESCRIPTION

Figure 1:
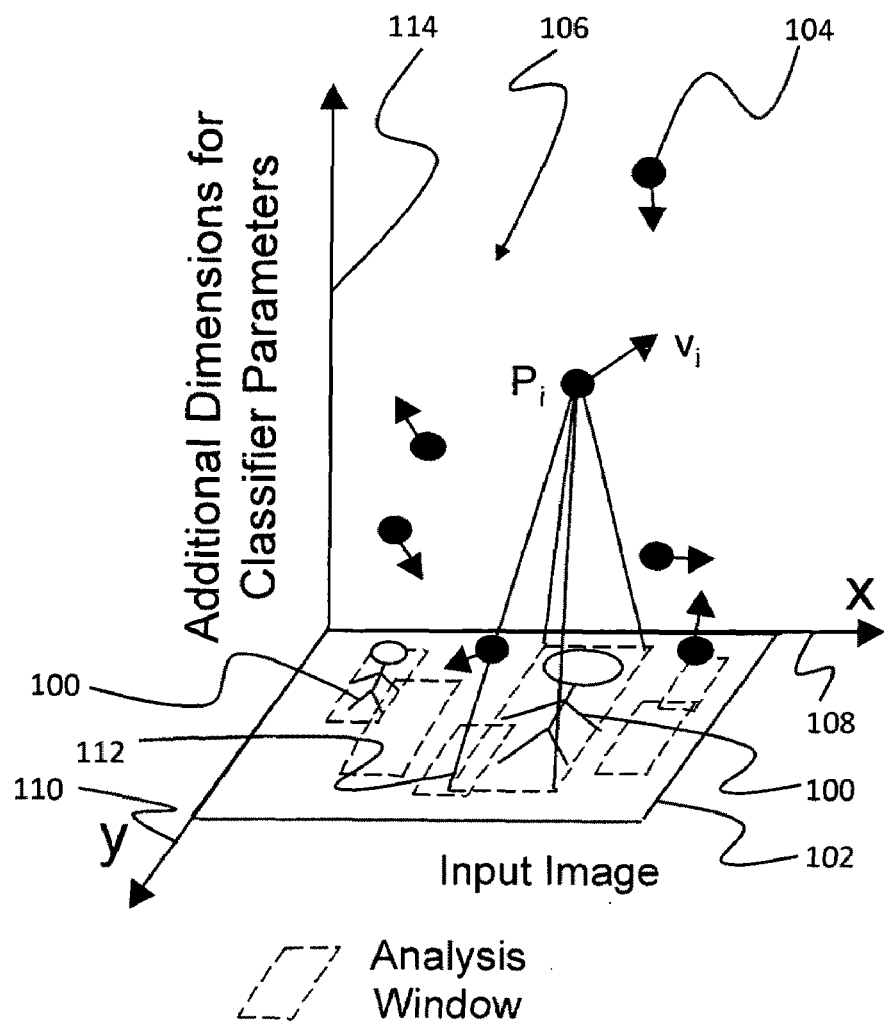
FIG. 1 is an illustration of architecture of an object recognition system according to the present invention.

The present invention relates to an object recognition system, and more particularly, to a system for visual recognitioN objects in a domain which combines feature-based object classification with search mechanisms based on swarm intelligence.

The following description, taken in conjunction with the referenced drawings and/or tables, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale, and are intended to generally present the concept of the present invention.

In order to provide a working frame of reference, first a glossary of terms used in the description and claims is given as a central resource for the reader. Next, a discussion of various principal aspects of the present invention is provided. Third, an introduction is provided to give the reader a brief understanding of the present invention. Next, a discussion of various aspects of the present invention is provided to give an understanding of the specific details. Finally, a conclusion is provided to summarize the invention discussed herein.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more clearly explaining the terms used.

Domain—The term "domain" refers to any searchable dimension in the solution space, non-limiting examples of which include spatial coordinates, scale, frequency, time, Doppler shift, time delay, wave length, and phase.

Flag Table—The term "flag table" refers to a table that has the same dimensions as the domain and is in one-to-one correspondence with it. All table entries within the width of the erasing predetermined function (e.g., Gaussian) are set ON. Or stated in the alternative, all table entries are initially set to an "OFF" position and when an object is identified and erased from the domain, the corresponding table entry is updated from the "OFF" to an "ON" position. If an agent lands on a location whose flag is set to "ON," the agent will not run its classifier since it is already known that an object is present at that location.

Large Core—The term "large core" refers to a relatively large volume in the solution space in which all points have classification confidence values above a given threshold. Objects tend to generate large cores.

PPSO—The term "PPSO" refers to a possibilistic particle swarm optimization algorithm that allows different groups of software agents (i.e., particles) to work together with different temporary search goals that change in different phases of the algorithm.

Predetermined Function—The term "predetermined function" refers to a function that defines a neighborhood around each agent in the solution space. This neighborhood is erased, for example, using Gaussian or Rect functions if an object is detected by an agent at its current location. Erasing the neighborhood prevents the object from further influencing the swarm, allowing it to search for new objects.

PSO—The term "PSO" refers to a particle swarm optimization (PSO) algorithm that searches a multi-dimensional solution space using a population of software agents (i.e., particles) in which each agent has its own velocity vector. The success of each agent in finding good solutions has an influence on the dynamics of other members of the swarm.

Sequential Niching—The term "sequential niching" refers to a method for searching a domain, where once the software agents identify and classify an object in the domain, the object is erased from the domain so that the swarm can continue searching the domain for additional objects without being distracted by the previously identified object.

Small Core—The term "small core" refers to a. relatively small volume in the solution space in which all points have classification confidence values above a given threshold. Non-object false alarms tend to generate small cores.

Software Agent—The term "software agent" refers to a self-contained computer program that operates autonomously, although its behavior may be affected by the actions of other agents. The term "software agent" is also to be used interchangeable with the word "particle."

Window—The term "window" refers to an analysis window determined by each agent's location in the image spatial coordinates and scale coordinates. The analysis window is the image region processed by the agent to determine if an object is located there.

(2) Principal Aspects

The present invention has three "principal" aspects. The first is an object recognition system using swarming domain classifiers, typically in the form of software and/or manual operations, operated using a data processing system (e.g., computer). When in the form of software, it is typically in the form of software modules configured to perform the operations described herein. The second principal aspect is a method for object recognition, the method operating using a computer system. The third principal aspect is a computer program product. The computer program product generally represents computer readable code (either source or object code) stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(3) Introduction

The present invention differs from other vision algorithms which use swarm intelligence in that the other methods use swarms to build up features using ant colony pheromone-based ideas. Swarming in the present invention is done at the classifier level in a space consisting, for example, of object location, scale, and classifier parameter dimensions and where each agent is a complete classifier. Two of the dimensions are used to locate objects in a domain (e.g., image), while the rest of the dimensions are used to optimize the classifier parameters. The software agents swarm in this space in order to find the local optima which correspond to objects in the domain. The classifier details are not visible at the abstraction level of the swarm. The present invention is substantially different from the previous work in that each software agent from the population is a unique classifier. As the population swarms around the solution space, the classifiers adjust parameters to best detect the objects in the scene.

The present invention is a much more efficient method for finding objects in a domain compared to searching based on sequentially scanning the domain or using gradient information, especially if the scale of the object is not known beforehand. For example, speedup factors of over two orders of magnitude relative to sequential scanning have been measured when searching in three dimensions. Additionally, the number of false alarms are also greatly reduced, which is important for practical applications. The speedup and false alarm advantages over sequential scanning increase as the number of dimensions is increased which makes it feasible to include object rotation angle as one of the search space dimensions. The present invention will help increase the range of applications for vision systems by improving performance, reducing computational requirements dramatically, eliminating the need for cueing sensors such as radar, and reducing overall cost of practical systems.

Furthermore, the present invention is applicable to a wide variety of automotive, military, and commercial vision systems with applications in the broad areas of automotive safety, autonomous vehicles, human vision enhancement, landmark recognition, automatic target recognition, homeland security, force protection, perimeter defense, and surveillance of both interior and exterior spaces.

(4) Discussion

The present invention describes a system and method for visual recognitioN objects in a domain which combines feature-based object classification with efficient search mechanisms based on swarm intelligence. For example, objects in a visual scene need to be located and classified so they can be tracked effectively for automotive safety, surveillance, perimeter protection, and a variety of other applications.

The present invention describes novel search mechanisms that can efficiently find multiple instances of multiple object classes in a domain, such as a scene, without the need for ancillary sensors or sequential searching. The objects are located and classified utilizing a particle swarm optimization (PSO) algorithm, a population based evolutionary algorithm which is effective for optimization of a wide range of functions. Although the PSO algorithm has been previously devised, it has never been used to recognize objects in various domains as applicable to the present invention. See, Kennedy, J., Eberhart, R. C., and Shi, Y., *Swarm Intelligence*, San Francisco: Morgan Kaufmann Publishers, 2001.

As applicable to the present invention, the algorithm models the exploration of multi-dimensional solution space by a population of individuals where the success of each individual has an influence on the dynamics of other members of the swarm. A novel aspect of the present invention is that a few of the dimensions are used to locate objects in the domain, while the rest of the dimensions are used to optimize the classifier parameters.

Conceptually, PSO includes aspects of Genetic Algorithms and Evolutionary Programming. Each potential solution is assigned a randomized velocity vector and the potential solutions called software agents, or particles, then move about in the solution space according to the PSO and PPSO (described in further detail below) dynamic techniques and search out good solutions through cooperation with other agents, in search of the function optima.

Each software agent keeps track of the coordinates in multi-dimensional space that are associated with the best solution (pbest) it has observed so far. A global best parameter (gbest) is used to store the best location among all agents. The velocity of each agent is then changed towards pbest and gbest in a probabilistic way according to the following velocity update technique:

$$v^i(t) = wv^i(t-1) + c_1 * \text{rand}(\ )*(pbest - x^i(t-1)) + c_2 * \text{rand}(\ )*(gbest - x^i(t-1))x^i(t) = x^i(t-1) + v^i(t),$$

where $x^i(t)$ and $v^i(t)$ are the position and velocity vectors at time t of the ith agent and $c_1$ and $c_2$ are parameters that weight the influence of their respective terms in the velocity update technique. w is a decay constant which allows the swarm to converge to a solution more quickly. * denotes multiplication. The rand( ) function generates a random number between 0 and 1.

The above dynamics reflect a socio-psychological model where individual software agents change their coordinates in accordance with a combination of the pbest and gbest. As an illustrative example, this is to be contrasted with models of cognition where an individual changes his beliefs (i.e., coordinates) to become more consistent with his own experience only (i.e., pbest). The random element introduces a source of noise which enables an initial random search of the solution space.

The search then becomes more directed after a few iterations as the swarm starts to concentrate on more favorable regions. This type of search is much more efficient than sequential search or gradient-based search methods. It is similar to GAs in that it can be used for discontinuous and noisy solution spaces since it only requires an evaluation of the function to be optimized at each agent position. No gradient information is used. Unlike GAs, the PSO agents are not modified at each iteration, they just travel to a different position, calculate the solution at that position, and compare it with their own (i.e., pbest) and global best value (i.e., gbest) in order to update their velocity vectors. PSO relies on the fact that in most practical problems the optimum solution usually has better than average solutions residing in a volume or core around it. These good solutions tend to attract the agents to the region where the optimum lies. The swarm becomes more and more concentrated until the optimum is found; e.g., gbest no longer changes. PSO has been applied to a wide variety of optimization problems. It has been found experimentally that the number of agents and iterations required scale weakly with the dimensionality of the solution space. The total number of function evaluations is very small compared to size of the solution space, as will be seen below. PSO searches only for a single optimum in the solution space, but various approaches have been described for finding multiple local optima or "niches." Since it is often desirable to locate multiple objects in a domain, the present invention also describes two approaches, sequential niching and possibilistic swarm optimization, for finding multiple optima.

The basic architecture for the present invention is shown in FIG. 1. The objective is to find multiple instances of an object class 100 in an input domain 102. The domain 102 may be any searchable domain, non-limiting examples of which include image, space, frequency, time, Doppler shift, time delay, wavelength, and phase. The PSO software agents 104 search in a solution space 106 where two of the dimensions represent the x 108 and y 110 coordinates in the input domain 102. A key concept in this approach is that each software agent 104 in the PSO swarm is a self-contained object classifier which outputs a value representing the classification confidence that the domain distribution in the analysis window 112 associated with that agent 104 is or is not a member of the object class 100. All agents 104 implement the same classifier structure, only the classifier parameters vary as the agent 104 visits different positions in the solution space 106. Two of the solution space 106 dimensions represent the location of the analysis window 112 on the input domain 102. A third dimension 114 represents the size or scale of the analysis window 112 in order to match the unknown size of objects 100 in the domain 102. Additional dimensions can be used to represent other classifier parameters, non-limiting examples of which include internal classifier parameters, object rotation angle, and time.

The present invention differs from other vision algorithms which use swarm intelligence in that the other methods utilize swarms to build up features using ant colony pheromone-based ideas. Swarming in the present invention is done at the classifier level in a space consisting of object location, scale, and other classifier parameter dimensions. Each agent is a complete classifier. The agents swarm in this space in order to find the local optima which correspond to objects in the domain. The classifier details are not visible at the abstraction level of the swarm. A multidimensional surface of classifier confidence (or saliency map) can be generated if the classifier is scanned across all of the dimensions. The saliency map for a domain can be discontinuous and noisy, with many isolated false alarms where the classifier responds incorrectly to patterns in the domain. Thus gradient-based methods cannot be used to find objects in the domain, which is why sequential scanning is usually used. By generating saliency maps for many domains, it can be seen that objects in the scene tend to have large "cores" of high confidence values. Many false alarms tend to be isolated with small cores. Since the probability of an agent landing in or near a core is greater for a larger core, the agents are attracted more to larger cores and the number of false alarms in a domain are reduced using PSO compared to sequential scanning. In sequential scanning, all of the false alarms in a domain will be detected so the classifier must be biased towards very low false alarm rates in order to keep the overall system false alarm rate low, which also has the side effect of reducing the detection rate.

As an illustrative example, the computational requirements of PSO classification compared to sequential scanning is shown in FIG. 2. The following example is provided for a further understanding of the invention, however, the invention is not to be construed as limited thereto. It can be appreciated by one in the art that the inputs and results can be changed and will fluctuate according to the particular application.

The speedup factor for PSO is $SM^2/PK$ where it is assumed that M scan positions were searched along x and y and S positions were searched along the scale dimension. P is the number of agents and K is the number of iterations. It was found that for realistic domains, P=80 and K=10 work well for searching in x, y, and scale. If M=100 and S=25, then the speedup factor was 312. The speedup advantage of PSO increases further with the number of dimensions. The number of false alarms was also reduced relative to sequential scanning.

Figure 3:
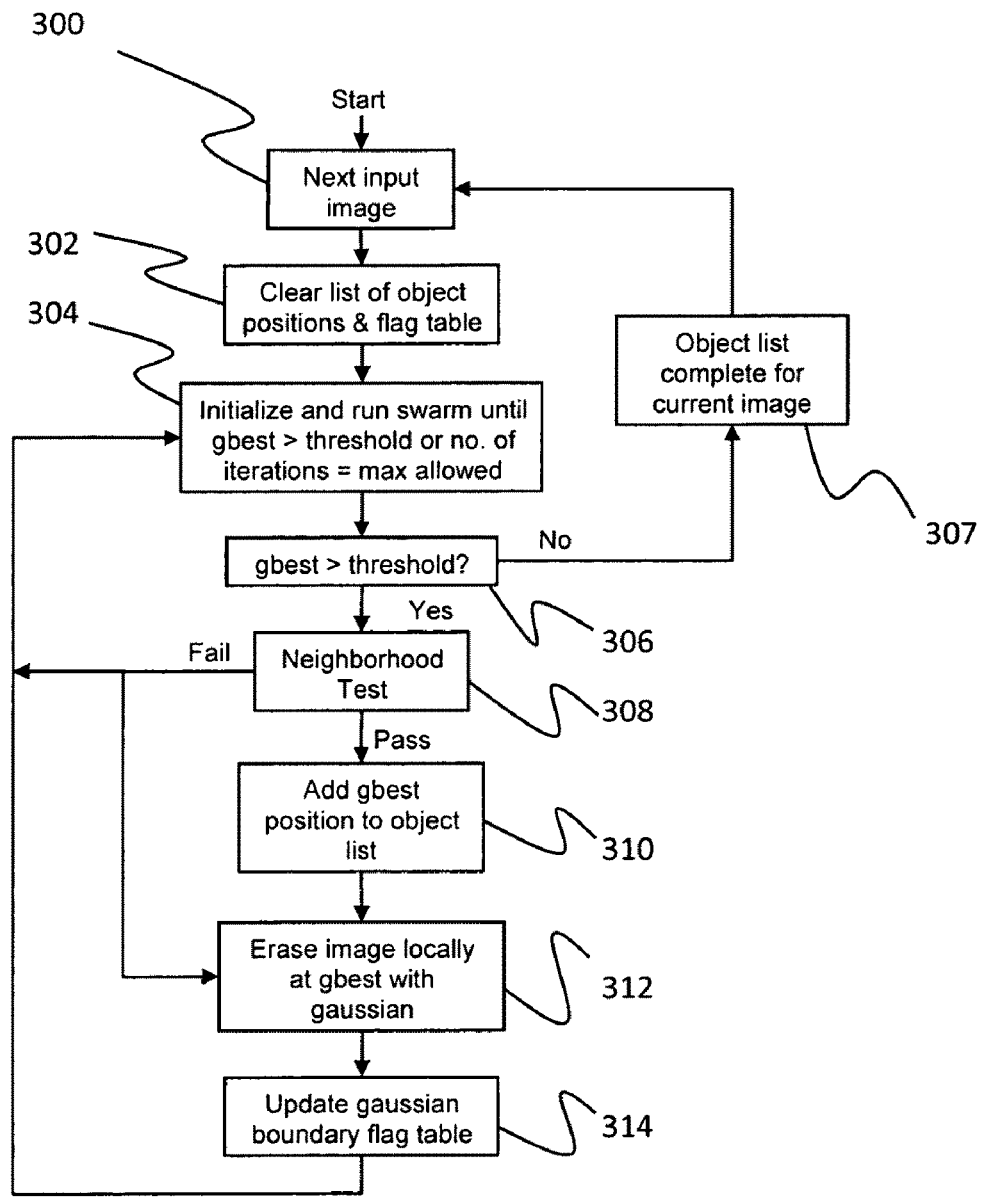
FIG. 3 is a flow chart illustrating a sequential niching method for finding multiple objects in a scene.

The flow chart for a sequential niching method for finding multiple objects in a scene is shown in FIG. 3. After an input domain 300 (e.g., image) is received, a running list of object positions in the domain (e.g., image and scene) is cleared along with the flag table 302 described below. The agent swarm of classifiers is then initialized in random positions in the solution space 304. The boundaries of the initialization volume can be set using various criteria. For example, if the flat ground constraint is appropriate, then the fact that objects of a certain size will appear only in certain subregions of the domain can be utilized to reduce the search volume. After initialization, the swarm dynamics are iterated until gbest exceeds a preset threshold or the number of iterations reaches a preset maximum value 306. If gbest does not exceed the value, then it is assumed that no targeted objects are present in the domain (e.g., image) and the object list is complete 307. The system then waits for the next input domain. If gbest does exceed the threshold, then a neighborhood or core check is performed around the gbest position to see if a certain number of neighboring positions in the domain also exceed the threshold for that analysis window size 308. If the gbest position passes the neighborhood test, then gbest is added to the list of object positions 310. The domain (e.g., image) is then erased locally at the gbest position with a predetermined function 312, non-limiting examples of which include a Gaussian function and a Rect function. For example, the image is erased locally at the gbest position with the Gaussian whose width is proportional to the analysis window size. If gbest does not pass the neighborhood test, there are two options. One option would be to re-initialize and run the swarm 304, allowing the swarm to continuously search the entire domain until gbest passes the neighborhood test. Another option would be to erase the domain at gbest 312, update the flag table 314, and then re-initialize and run the swarm 304. The purpose of the local erasure step is to remove that object's influence on the swarm when the swarm is re-initialized to search for the next object. By erasing the domain locally, the influence of that region on the swarm across all dimensions is eliminated. After the domain erasure step, a flag table is updated with the erasing predetermined function 314. The flag table has the same dimensions as the domain and is in one-to-one correspondence with it. All table entries within the width of the erasing predetermined function (e.g., Gaussian) are set to an "ON" position. Or stated in the alternative, all table entries are initially set to an "OFF" position and when an object is identified and erased from the domain, the corresponding table entry is updated from the "OFF" to an "ON" position. If an agent lands on a location whose flag is set to "ON," the agent will not run its classifier since it is already known that an object is present at that location.

Instead, the agent will keep its previous pbest value. The use of the flag table eliminates unnecessary classifier evaluations in regions where it has already been determined that an object exists which speeds up the swarm, especially if large objects are present in the scene. Repelling forces at object locations are not implemented to avoid isolating regions. After the flag table (e.g., Gaussian flag table) is updated, the swarm is re-initialized to search for the next object. The flag table is cleared when a new domain is acquired 302.

This approach can be extended naturally to searching for members of different object classes in parallel. This can be accomplished by running multiple swarms for multiple object classes, where each swarm maintains its own gbest, pbest, and object lists. The swarms interact indirectly only through the erasing predetermined functions (e.g., Gaussians) and flag table which are common to all swarms. Thus if a swarm detects an object at a particular location in the domain, the other swarms do not try to find other objects there.

For illustrative purposes, the sequential niching swarming classifiers method has been successfully implemented for detecting objects (e.g., pedestrians) in a domain (e.g., scene) of unknown position and size. Each of the agents consisted of a classifier based on Haar wavelet and fuzzy symmetry features and a back-propagation neural network classification engine. Other classifiers can be used, such as decision tree and correlater classifiers.

The following demonstration was done in Matlab with the agent classifiers implemented using a C++ dynamic link library called from Matlab. Matlab is a scientific and engineering software tool produced by The MathWorks, Inc., located at 3 Apple Hill Drive, Natick, Mass., 01760-2098, U.S.A. The results are shown in FIGS. 4 to 7, with the units in pixels. As was the case with the above example, the following example is provided for a further understanding of the invention; however, the invention is not to be construed as limited thereto. It can be appreciated by one in the art that the inputs and results can be changed and will fluctuate according to the particular application.

The swarm was programmed to search for pedestrians in the x, y, and size dimensions. In these examples, infrared spectrums were used, but the approach works equally well in the visible spectrum. In fact, the classifier was trained using visible light domains only. The first test domain was a single person walking outside between a building and a railing with hills in the background.

Figure 4:
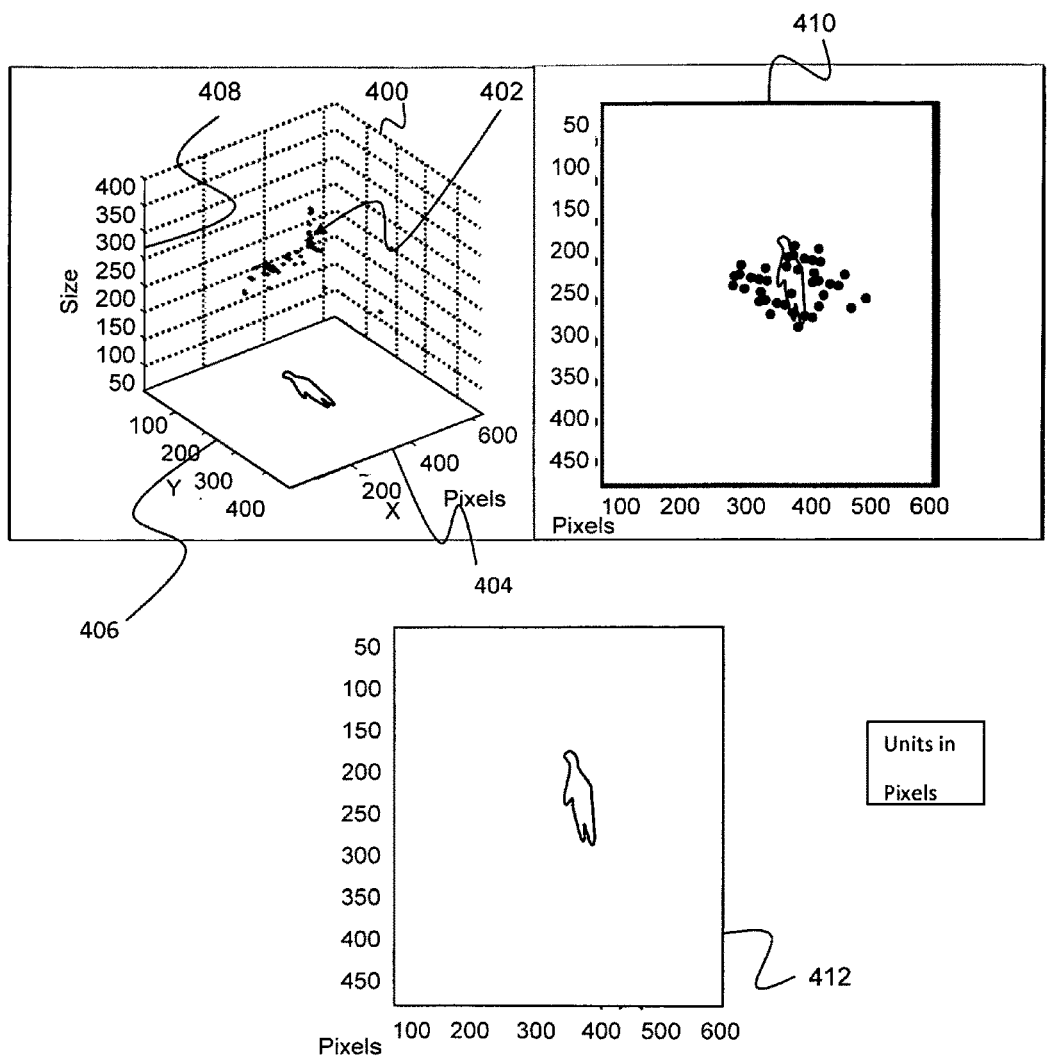
FIG. 4 is an illustration showing results for a sequential niching PSO vision system for a single pedestrian (i.e., object) in the infrared spectrum, with results shown after a single iteration of the swarm (the object is not yet detected in this example)

FIG. 4 shows the swarm after a single iteration. The three-dimensional solution space 400 with the current positions of the classifier agents 402 (i.e., particles) is shown. At this early stage, the agents 402 are distributed widely in x 404, y 406, and size 408. Software agents are shown as black dots. The agents that exceed the classification threshold and pass the neighborhood test are shown as an "X." The upper right domain 410 shows the agent positions projected on the x-y plane of the input domain, including the effects of any erasing predetermined functions (e.g., Gaussians). The analysis windows corresponding to the agents, as denoted by an X, are shown superimposed on the input domain in the lower part 412 of the figure. After only one iteration, the agents are shown as black dots and the pedestrian has not yet been found.

Figure 5:
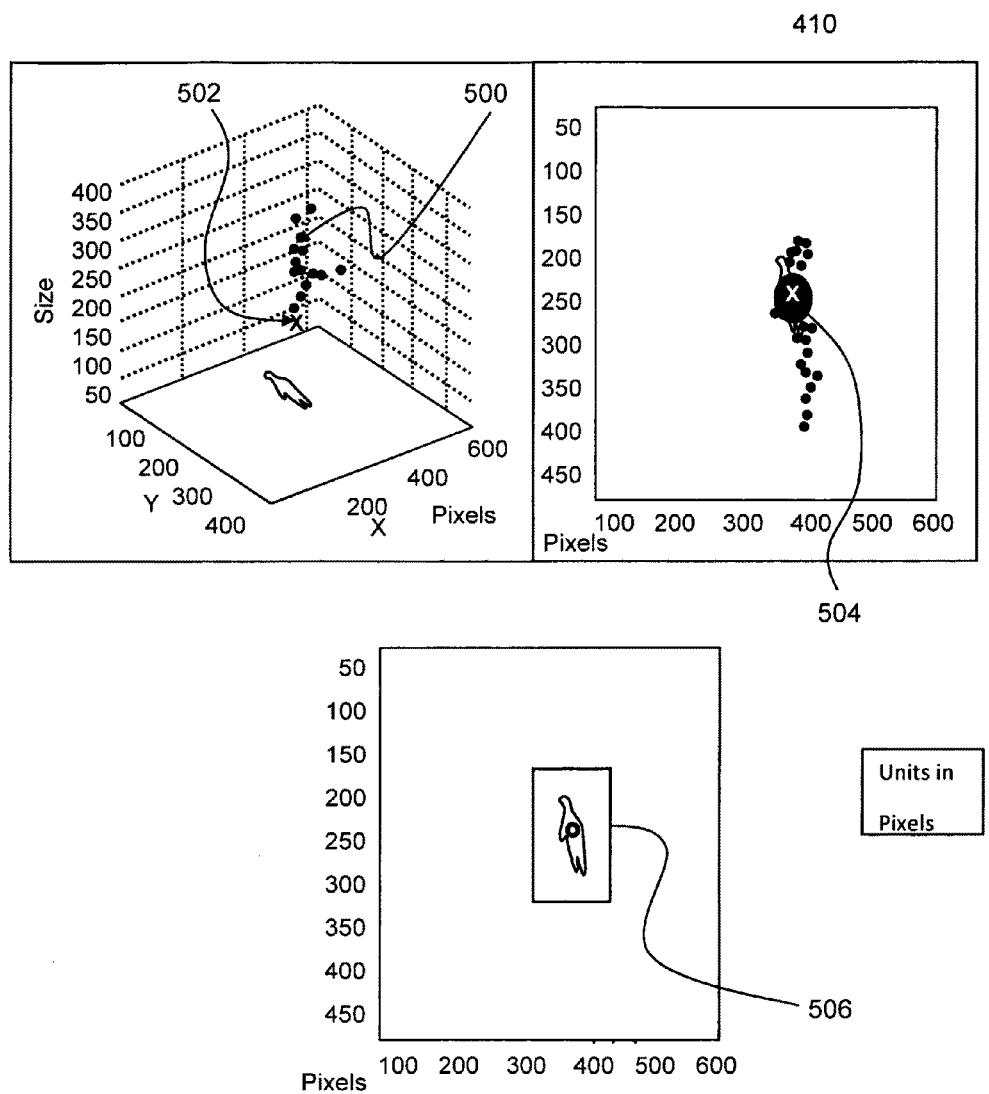
FIG. 5 is an illustration showing results for a sequential niching PSO vision system for a single pedestrian in the infrared spectrum, with results shown after ten iterations of the swarm (in this example, the object has been detected and it was determined that no other pedestrians are present in the domain)

FIG. 5 shows the swarm after 11 iterations. The agents 500 are now centered on the pedestrian with a range of window sizes. Only one agent 502 passes the classifier threshold and neighborhood tests. The corresponding erasing predetermined function (e.g., Gaussian) 504 and window 506 are shown. It should be emphasized that it is not necessary to wait until the entire swarm condenses on an object before deciding an object is at that location. The location is labeled as an object as soon as a single agent passes the classification and neighborhood tests, at which point the domain is erased locally, the boundary table is updated, the swarm is re-initialized, and a search starts for the next object in the scene.

Figure 7:
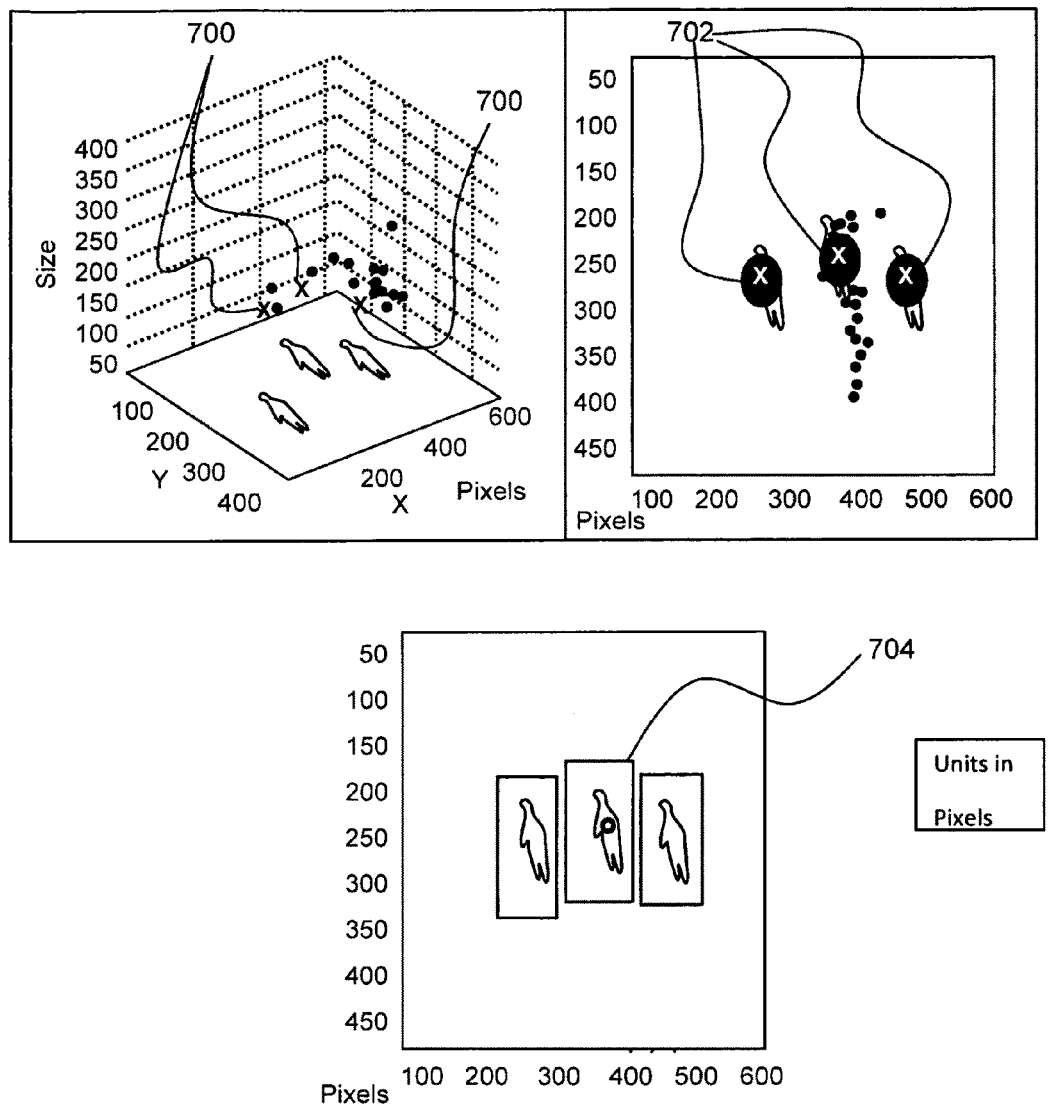
FIG. 7 is an illustration showing results for a sequential niching PSO vision system for multiple pedestrians in the infrared spectrum, with results shown after ten iterations of the swarm (in this example, all three objects have been detected and it was determined that no other pedestrians are present in the domain)

In FIGS. 6, and 7, results are shown for an infrared domain with multiple pedestrians. FIG. 6 illustrates the swarm having found one of the pedestrians 600 after only one iteration. As described above, the corresponding erasing predetermined function (e.g., Gaussian) 602 and window 604 are shown. As shown in FIG. 7, after 11 iterations all three pedestrians 700 were detected and it was determined that no more pedestrians were present. Note the three erasing Gaussians 702 in the upper right centered on the pedestrians, with their corresponding windows 704 shown in the bottom chart.

The same swarm parameters and classifier were used for both of these non-limiting examples. The number of agents was 80 and the maximum number of iterations was limited to 11. The total number of classifier evaluations was 1280 for the single pedestrian and 1840 for the multi-pedestrian example. This is far less than the number of evaluations necessary to search by scanning in x, y, and scale. Pedestrians are often detected within 2 to 3 iterations.

Figure 8:
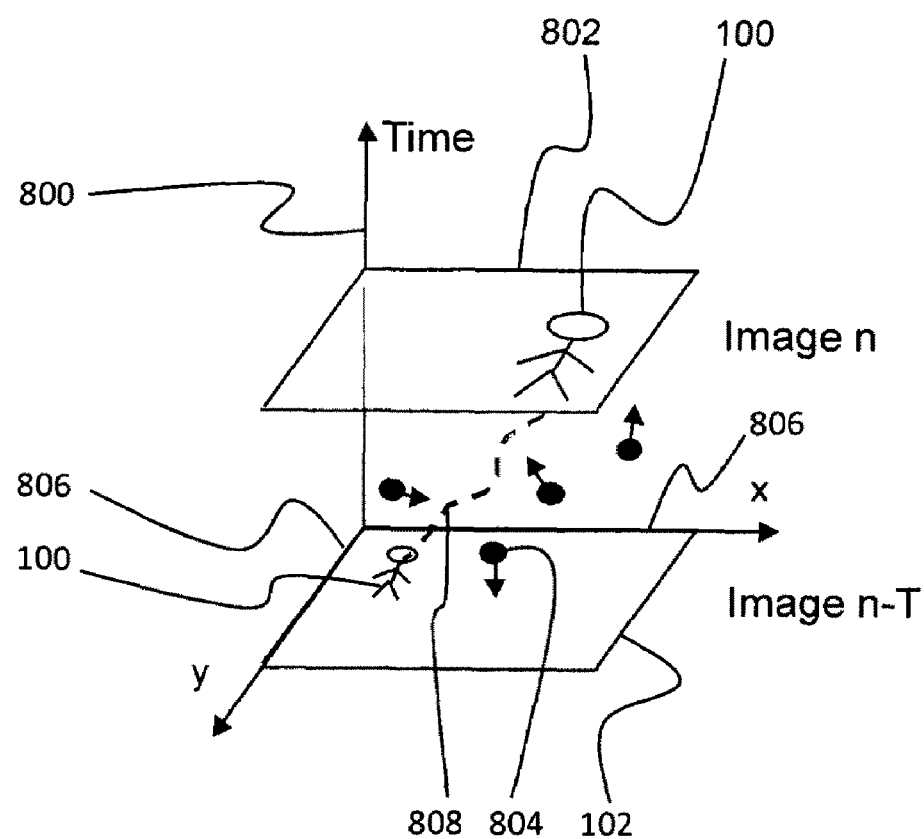
FIG. 8 is a graph illustrating objects in space and time by using PSO to search a stack of time-separated domains using a swarm of classifiers, where consistent objects form a connected "saliency volume" in space-time which are more easily found by the swarm than isolated false alarms.

Most of the processing is spent on determining that no more pedestrians are present by propagating the swarm until the maximum allowed number of iterations is reached. The effect of this overhead can be reduced by adding the time dimension 800, as shown in FIG. 8. In this case a video cube consisting of a stack of domain (e.g., image) snapshots 802 taken at discrete time intervals is searched by the swarm 804 as opposed to a single domain. Advantages of searching in time 800 as well as in space 806 include automatically finding the space-time paths 808 of objects 100, further reduction in false alarms because consistent objects 100 will form extended saliency "tubes" in space-time, and the object sweep necessary for determining if all objects 100 have been found needs to be done only once for each domain stack 802 rather than for each individual domain 102.

Another approach to locating multiple objects is to use a possibilistic particle swarm optimization (PPSO) algorithm that can quickly and automatically converge on the different objects in the domain (e.g., scene). The PPSO approach uses possibilistic clustering to extend the standard PSO to find multiple optima in the solution space. The main idea of PPSO is to let groups of software agents to work together with different temporary search goals that change in different phases of the algorithm. The algorithm runs in two phases namely the exploratory and the localization phase. In the exploratory phase, software agents search around the solution space trying to locate all possible minima. In contrast, in the localization phase, agents try to search in local neighborhoods in an attempt to best locate the closest minima in the neighborhood. This dual phase algorithm is extended from the standard PSO using an elastic constraint around each potential minimum. The elastic constraint for each optimum covers the entire search space in the exploratory phase and is restricted to a small neighborhood around each of the optima in the localization phase. A possibilistic membership function that indicates the degree to which each agent corresponds to a minimum is computed and used to alter the dynamics of the agents.

Figure 9:
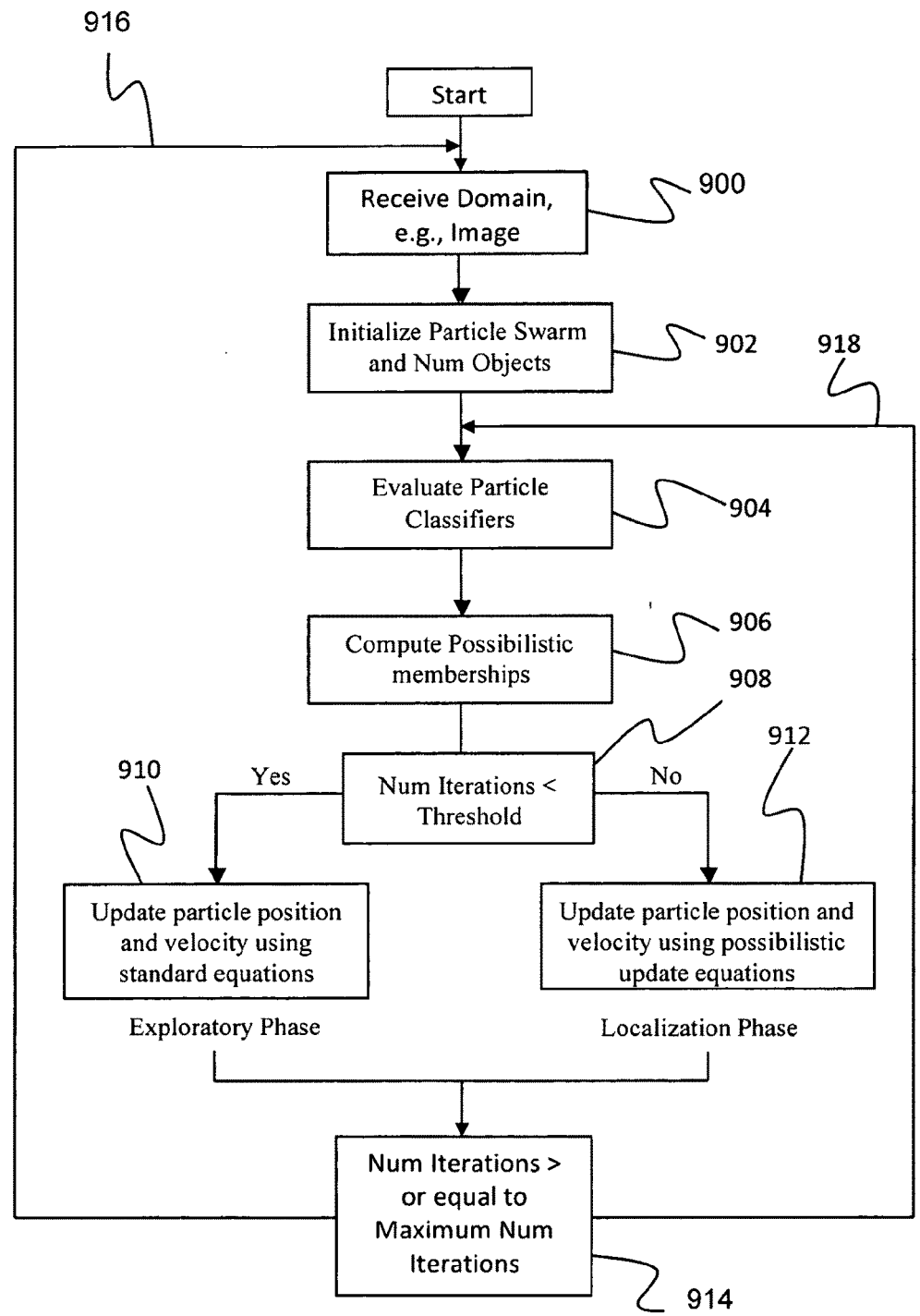
FIG. 9 is a flow chart illustrating a Possibilistic PSO (PPSO) system.

A block diagram of the PPSO approach is given in FIG. 9. The PPSO approach includes receiving a domain into a swarming domain classifier 900. The agent swarm is then initialized for N objects 902. Agent classifiers are then evaluated at each location by running the classifier to determine a classification value for the domain at each agent's location 904.

Possibilistic memberships are thereafter computed 906 using the following possibilistic membership technique for $\mu_{ij}$, where $$\mu_{ij} = \frac{\eta_j}{\eta_j + d_{ij}^2},$$

and $\eta_j$ is a dynamic elastic constraint around the jth minima, and $d_{ij}^2$ is the distance of the ith agent to the jth minima, and where initially $\eta_j$ is unbounded and it is slowly decreased to a small region around the local minima.

The number of iterations is thereafter determined 908. If the number of iterations is less than a predetermined value, the agent's position is then updated and velocity proceeds according to the velocity update technique described above 910. If the number of iterations is greater than the predetermined value, the agent positions are then updated and velocity proceeds according to a possibilistic update technique 912. The possibility update technique in the PPSO model (i.e., possibilistic update technique of the localization phase) is given below:

$$v^i(t) = wv^i(t-1) + c_1 * rand() * (pbest - x^i(t-1)) +$$

$$c_2 * rand() * \sum_{j=1}^{C} \mu_{ij}(gbest^j - x^i(t-1)).$$

The number of iterations is thereafter determined as to whether the number has reached a predetermined maximum number of iterations 914. If the number of iterations is greater than or equal to the predetermined maximum number of iterations, then a new domain is input into the swarming domain classifier 916. If the number of iterations is less than the predetermined number of iterations, then the swarming domain classifier is continuously ran on the domain, beginning at the step for evaluating agent classifiers at each location 918.

The above dynamics ensure that the algorithm works in two phases. In the first phase, the agents strive to locate the best global minima while keeping track of other minima that have been located. After the first phase, the agents then repel each other and distribute themselves to other minima in the function space. Note that unlike the PSO approach, the number of objects in the domain (e.g., scene/image) must be specified. However, a threshold does not need to be specified as in the PSO approach.

For further illustrative purposes, the PPSO approach has been successfully implemented for detecting objects (e.g., pedestrians) in a three-dimensional (3D) domain. In the illustrative results presented here, a pedestrian classifier is used that was trained on Haar wavelet and fuzzy edge symmetry features using a neural network. The task of locating objects in the scene is accomplished by using PPSO, where a classifier is invoked at each agent position to determine if the region visited by the agent is a valid object or not. Three-dimensional PPSO was performed where the first two dimensions correspond to the spatial dimensions of the object and the third dimension to the scale of the object.

Figure 10:
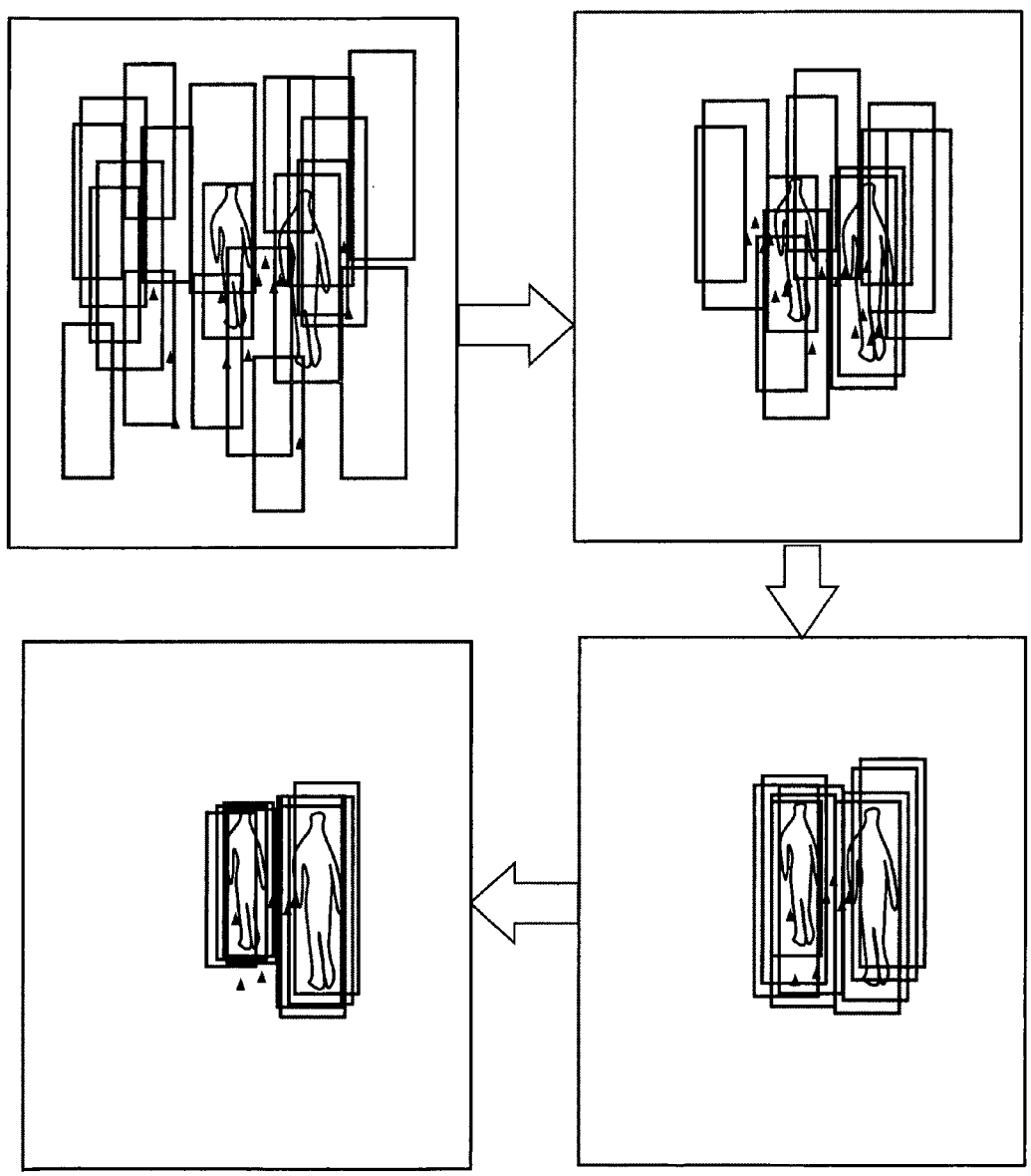
FIG. 10 is an illustration showing different stages of the algorithm in detecting a person in near infrared spectrum.

FIG. 10 illustrates the different stages of the algorithm in detecting a person in the near infrared domain. As illustrated, as the number of iterations is increased, the agents converge on the object. On convergence, the scale and location of the object can be obtained.

Figure 11:
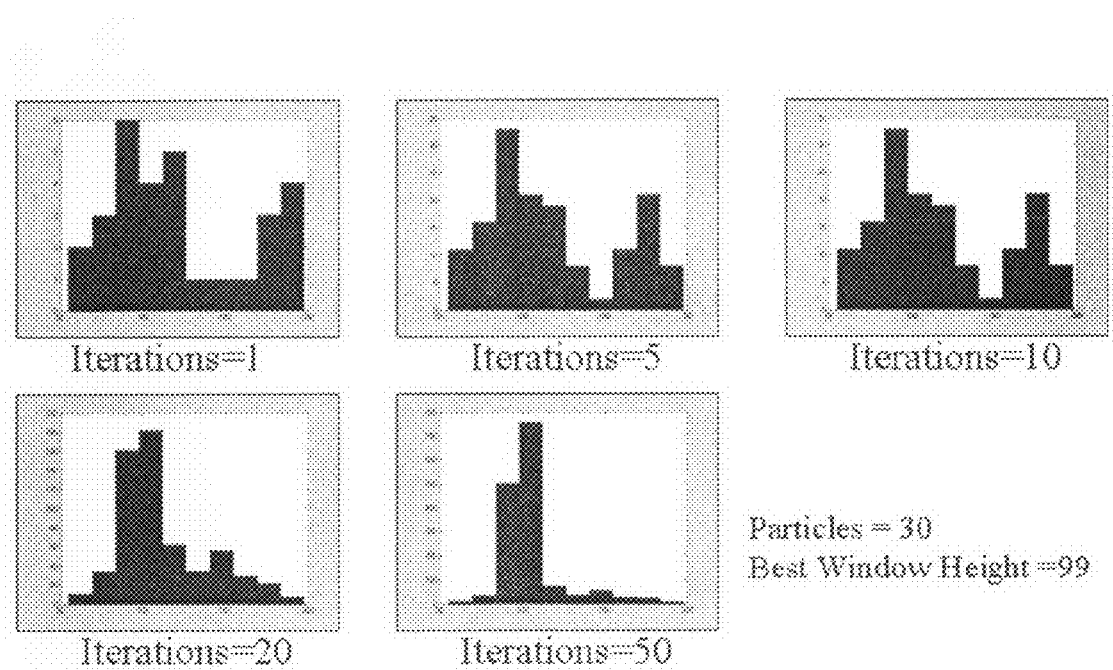
FIG. 11 is an illustration showing the distribution of window sizes as the swarms converge to the correct pedestrian locations and size.

FIG. 11 is a histogram that shows the distribution of window sizes as the swarms converge to the correct pedestrian locations and size after the shown number of iterations. The horizontal axis is in pixels, while the vertical axis indicates the number of windows that are in each bin in the graph.

Figure 12:
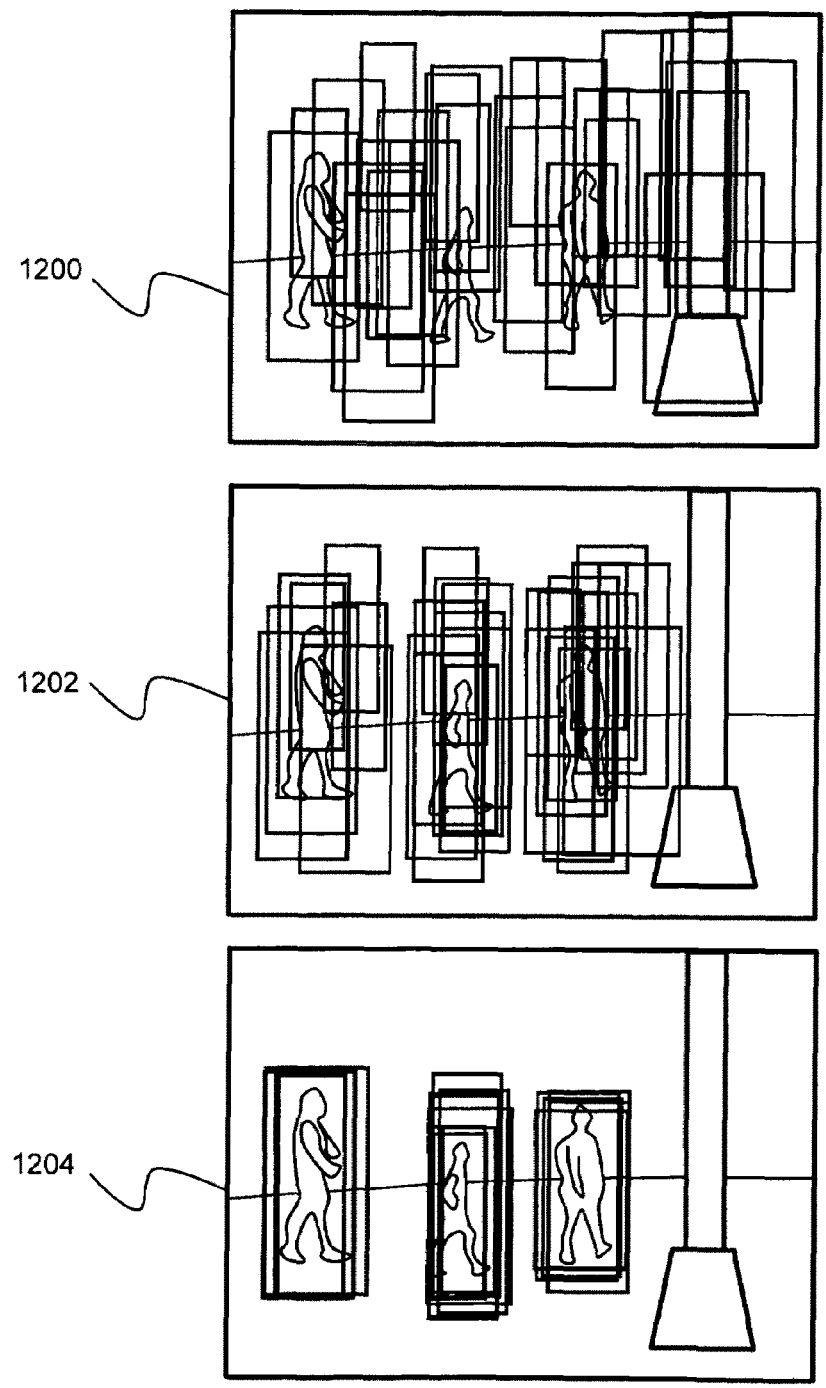
FIG. 12 is an illustration showing the performance of a three-dimensional PPSO system in detecting three pedestrians in an urban setting.
Figure 13A:
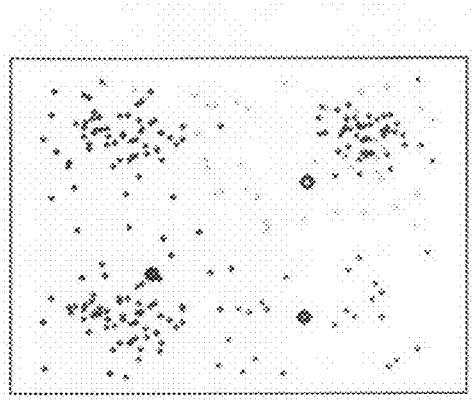
FIG. 13A illustrates PPSO applied to data clustering at initialization, three clusters and 100 agents (i.e., particles), showing three randomly selected centers and the agents based on the proximity to a center.
Figure 13B:
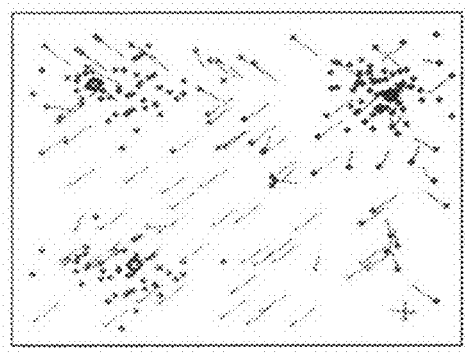
FIG. 13B is an illustration of the PPSO of FIG. 13A after two iterations, where the agents (i.e., particles) are exploring the space and swarming toward the current global minima.
Figure 13C:
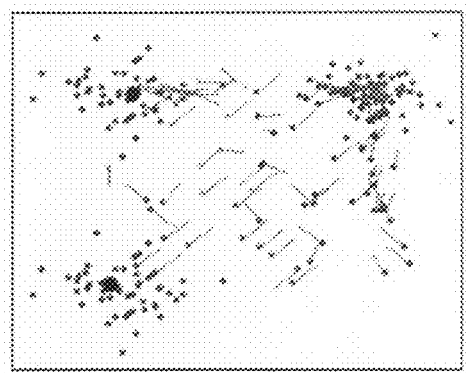
FIG. 13C is an illustration of the PPSO of FIG. 13B after four iterations.
Figure 13D:
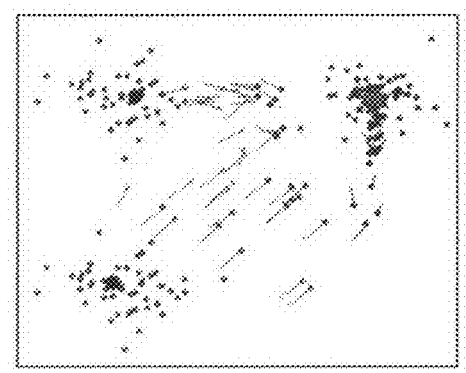
FIG. 13D is an illustration of the PPSO of FIG. 13C at the end of an exploratory phase, showing how the agents (i.e., particles) traverse to local minima in their neighborhoods.
Figure 13E:
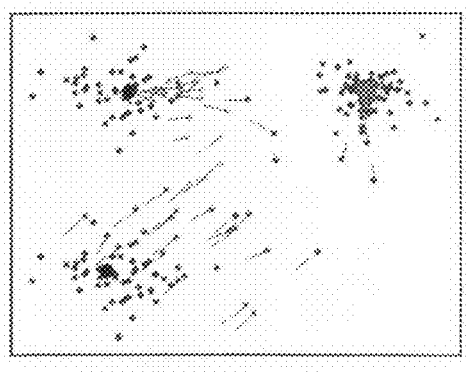
FIG. 13E is an illustration of the PPSO of FIG. 13D after a few more iterations in the localization phase.
Figure 13F:
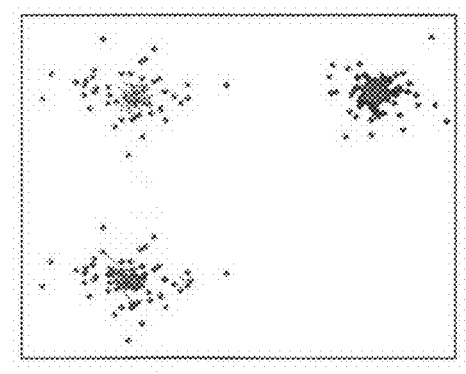
FIG. 13F is an illustration of the PPSO of FIG. 13E, showing a final result.

FIG. 12 shows another example that illustrates the performance of the three-dimensional PPSO approach in detecting three pedestrians in an urban setting. As shown in FIG. 12, the agents and windows increasingly converge on the three objects as the algorithm progresses from an initialization stage 1200, to an intermediate stage 1202, and a final stage 1204.

For further illustration, another experiment was performed using the PPSO for data clustering and object detection. The results on data clustering are first presented. In this experiment, three two-dimensional (2D) Gaussian clusters were created, each of size 50 points and were placed at (25, 15), (20, 10), and (20, 15) respectively. One hundred software agents were used and ran in the PPSO algorithm in an effort to locate the three clusters in the data. In each iteration, an objective function needed to be evaluated at the location of each software agent. Possibilistic cluster means (PCM) and possibility theory were used to compute the objective function value. A center was assumed to exist at the location of each agent and the membership of every data point in the cluster was computed. A zone of influence was established around the cluster by choosing the value of $\eta$ (set to three). The memberships were computed using the standard PCM membership technique. Once the objective function at each agent was computed, the PPSO dynamics then iterates through the exploratory and localization phases. Five iterations of the exploratory phase and ten iterations of localization phase were specified.

The results from different iterations of the PPSO swarm are presented in FIG. 13. FIG. 13A illustrates the initialization of PPSO with three randomly selected cluster centers and the resulting agent memberships. FIG. 13B illustrates the results of PPSO after 2 iterations, showing agents exploring the space and swarming towards the current global minima. FIG. 13C illustrates the PPSO results after 4 iterations. FIG. 13D illustrates the PPSO results at the end of the exploratory phase, where it can be seen that the agents traverse to local minima in their neighborhoods. FIG. 13E illustrates the PPSO results after a few more iterations in the localization phase, while FIG. 13F illustrates the final result after convergence of the software agents.

Figure 14A:
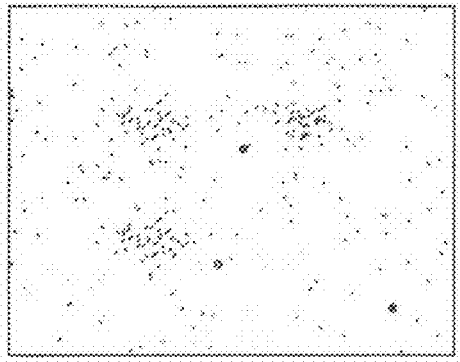
FIG. 14A illustrates PPSO applied to data clustering at initialization, three clusters (150 pts) with 100 noise points and 100 agents (i.e., particles), showing the three randomly selected centers and the agents based on the proximity to a center.
Figure 14B:
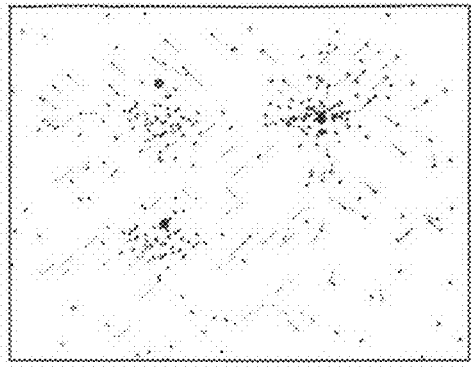
FIG. 14B is an illustration of the PPSO of FIG. 14A after two iterations, where the agents (i.e., particles) are exploring the space and swarming towards the current global minima.
Figure 14C:
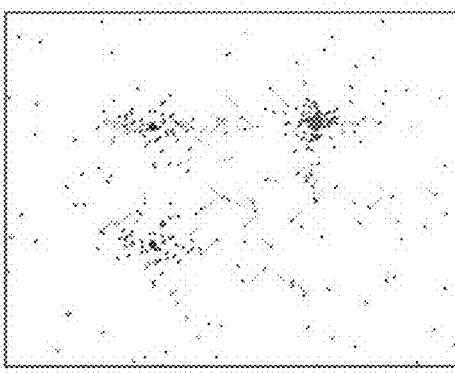
FIG. 14C is an illustration of the PPSO of FIG. 14B after four iterations.
Figure 14D:
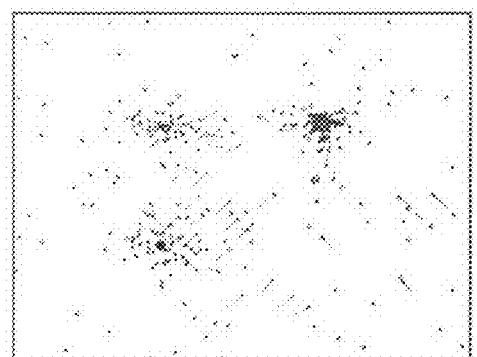
FIG. 14D is an illustration of the PPSO of FIG. 14C at the end of an exploratory phase, showing how the agents (i.e., particles) traverse to local minima in their neighborhoods.
Figure 14E:
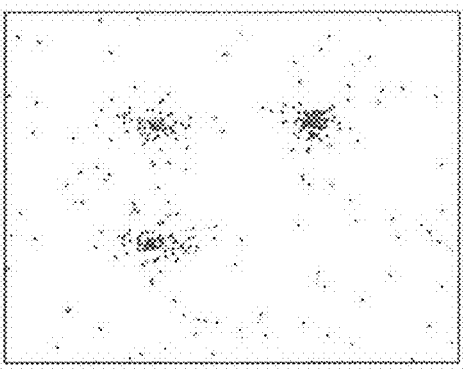
FIG. 14E is an illustration of the PPSO of FIG. 14D after a few more iterations in the localization phase.
Figure 14F:
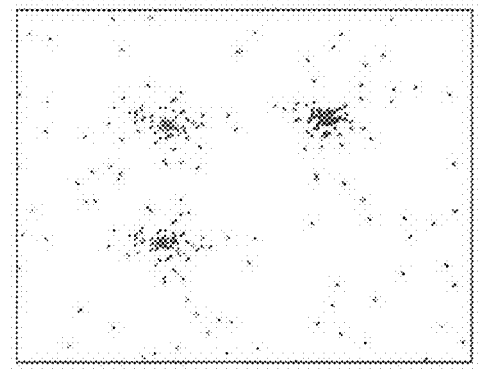
FIG. 14F is an illustration of the PPSO of FIG. 14E, showing a final result.
Figure 16A:
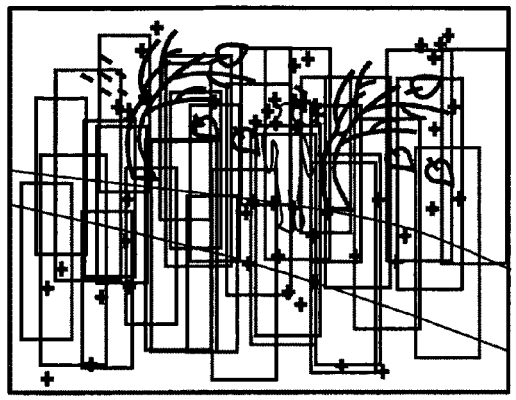
FIG. 16A illustrates an initialized swarm with three-dimensional (3D) results wherein each agent is a classifier using a different window height.
Figure 16B:
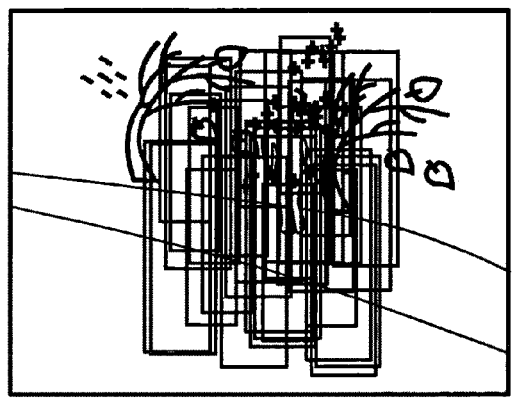
FIG. 16B illustrates the swarm of FIG. 16A after ten iterations.
Figure 16C:
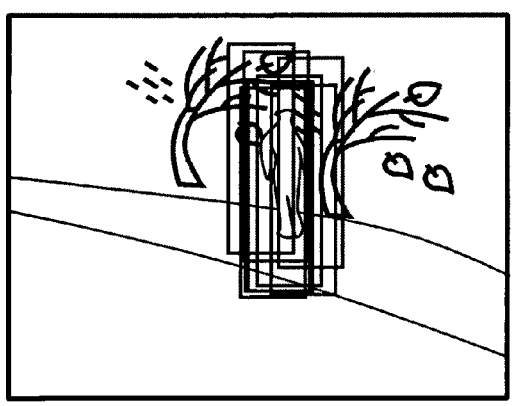
FIG. 16C illustrates the swarm of FIG. 16B after 20 iterations.
Figure 16D:
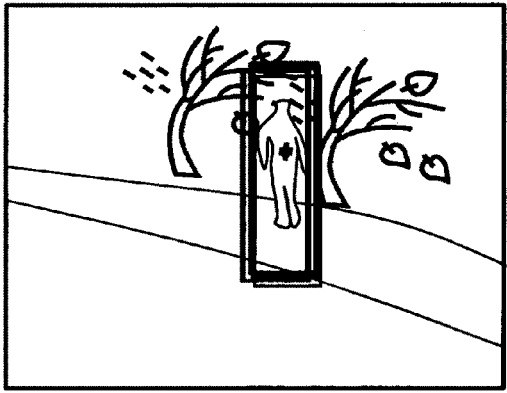
FIG. 16D illustrates the swarm of FIG. 16C after convergence on the object (i.e., human)

In another experiment, 100 uniformly distributed noise points were added to the above three cluster data set. The process mentioned immediately above was repeated and the results are presented in FIG. 14. FIG. 14A illustrates the initialization of PPSO with three randomly selected cluster centers and the resulting agent memberships. FIG. 14B illustrates the results of PPSO after 2 iterations, showing agents exploring the space and swarming towards the current global minima. FIG. 14C illustrates the PPSO results after 4 iterations. FIG. 14D illustrates the PPSO results at the end of the exploratory phase, where it can be seen that the agents traverse to local minima in their neighborhoods. FIG. 14E illustrates the PPSO results after a few more iterations in the localization phase, while FIG. 14F illustrates the final result after convergence of the software agents. From the results, it can be shown that the proposed PPSO algorithm is robust to the presence of noise and accurately locates the centers of the three clusters.

Another experiment was also conducted wherein the PPSO was forced to look for only two clusters although the data set had three clusters. As expected, the PPSO algorithm accurately detected two of the three clusters in the data.

Experimental results on using the PPSO in the object detection mode are as follows. In object detection mode, each agent is an object classifier that can accurately detect an object of interest. In this example, a classifier to detect humans was developed. Given a 2:1 aspect ratio window in an image, pre-selected Haar wavelet features were computed along with a set of fuzzy edge-symmetry features. This combined 190 dimensional feature vector was then passed to a multi-layer back propagation neural network for detecting the presence of a human in the selected window region. Typically, to find all humans in the scene, the window needs to be scanned across the entire image. In conventional approaches, an estimate of the object height or depth from the camera needs to be known to determine the height of the scanning window. In this approach, the height of the classifier is also automatically obtained from the PPSO swarm dynamics.

FIG. 15 illustrates two-dimensional (2D) results where the PPSO is searching for only the (xy) location of the human in the scene while operating with a known window size that corresponds to the human in the scene. FIG. 15A illustrates an original image with an initialized swarm. FIG. 15B illustrates the swarm of FIG. 15A after ten iterations. FIG. 15C illustrates the swarm of FIG. 15B after 20 iterations, while FIG. 15D illustrates the swarm of FIG. 15C after convergence on the object (i.e., human).

FIG. 16 illustrates general three-dimensional (3D) results wherein each agent is a classifier using a different window height. FIG. 16A illustrates an original image with an initialized swarm. FIG. 16B illustrates the swarm of FIG. 16A after ten iterations. FIG. 16C illustrates the swarm of FIG. 16B after 20 iterations, while FIG. 16D illustrates the swarm of FIG. 16C after convergence on the object (i.e., human). On convergence, the PPSO swarm locates not only the (xy) position of the object but also the exact height of the object in the scene.

Figure 17:
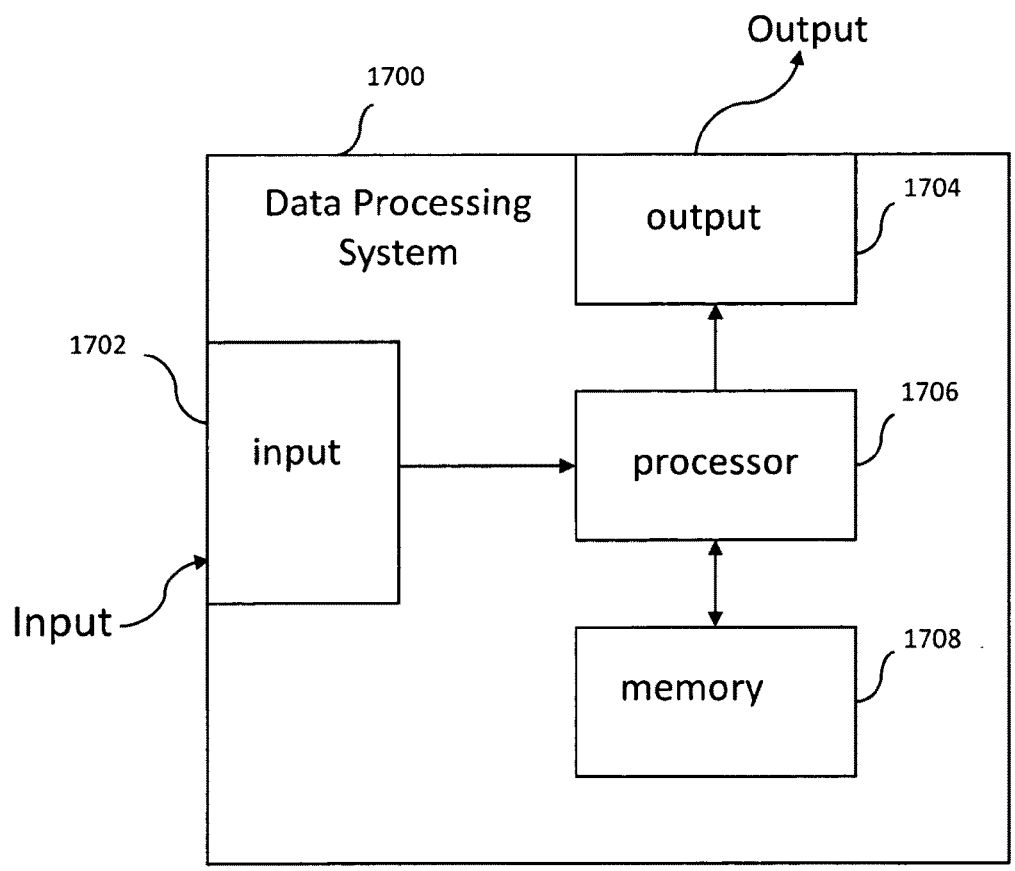
FIG. 17 illustrates a component diagram depicting components of a data process system according to the present invention.

FIG. 17 illustrates a component diagram depicting components of a data processing system 1700 (e.g., computer) incorporating the operations of the method and technique described above. The technique utilizes the data processing system 1700 for storing computer executable instructions for causing a processor to carry out the operations of the above described technique. The data processing system 1700 comprises an input 1702 for receiving information from a user. Information received may include input from devices such as cameras, scanners, keypads, keyboards, microphone, other peripherals such as storage devices, other programs, etc. The input 1700 may include multiple "ports." An output 1704 is connected with the processor for providing information for transmission to other data processing systems, to storage devices, to display devices such as monitors, to generating information necessary for delivery, and to other mechanisms for presentation in user-usable forms. Output may also be provided to other devices or other programs, e.g., to other software modules, for use therein. The input 1702 and the output 1704 are both coupled with a processor 1706, which may be a general-purpose computer processor or a specialized processor designed specifically for use with the present invention. The processor 1706 is coupled with a memory 1708 to permit storage of data and software to be manipulated by commands to the processor.

Figure 18:
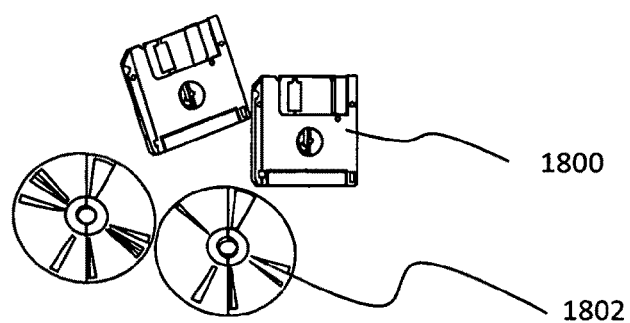
FIG. 18 illustrates a diagram of a computer program product according to the present invention.

An illustrative diagram of a computer program product embodying the present invention is depicted in FIG. 18. As a non-limiting example, the computer program product is depicted as either a floppy disk 1800 or an optical disk 1802. However, as mentioned previously, the computer program product generally represents computer readable code stored on any compatible computer readable medium.

(5) CONCLUSION

The present invention describes the concept of classifier swarms for effectively searching a domain for multiple objects of interest. The particle swarm optimization algorithm was extended using sequential niching methods to search for multiple minima. A classifier, such as a human detection classifier that uses Haar wavelet and edge-symmetry features, was designed. A human detection classifier was used in place of the usually used agent in the sequential niching PSO. Additionally, a PPSO algorithm was described that allows a user to indicate the number of objects and locate the desired objects. From the variety of results presented, it is shown that the present invention is an efficient and effective search mechanism. It is also shown to be very fast and can robustly detect multiple objects in a variety of domains.

What is claimed is:

1. An object recognition system incorporating swarming domain classifiers, comprising:
    a processor that includes a plurality of software agents configured to operate as a cooperative swarm to classify an object in a domain, where each agent is assigned an initial velocity vector to explore a solution space for object solutions, and where each agent is a complete classifier which determines a classification value representing a classification confidence that the solution space in the domain includes the object, and where the classification value for each agent is independent of other agents, and where each agent is configured to perform at least one iteration, the iteration being a search in the solution space for a potential solution optima where each agent keeps track of its coordinates in multi-dimensional space that are associated with an observed best solution (pbest) that the agent has identified, and a global best solution (gbest) where the gbest is used to store the best location among all agents, with each velocity vector thereafter changing towards pbest and gbest, allowing the cooperative swarm to concentrate on the vicinity of the object and classify the object when the classification value exceeds a preset threshold;
    wherein each velocity vector changes towards pbest and gbest in a probabilistic way; and
    wherein the plurality of agents constitutes a possibilistic particle swarm optimization module for finding multiple objects in the domain, the possibilistic particle swarm optimization module configured to update agent position and velocity using a possibilistic update technique when the number of iterations is greater than a preset value, agent velocity in the possibilistic particle swarm optimization module is calculated according to the following:

$$v^i(t) = wv^i(t-1) + c_1 * rand() * (pbest - x^i(t-1)) +$$
$$c_2 * rand() * \sum_{j=1}^{C} \mu_{ij}(gbest^j - x^i(t-1)),$$

where $$\mu_{ij} = \frac{\eta_j}{\eta_j + d_{ij}^2},$$

and $\eta_j$ is a dynamic elastic constraint around the jth minima, and $$d_{ij}^2$$

is the distance of an ith agent to a jth minima, and where initially $\eta_j$ is unbounded and it is slowly decreased to a small region around the local minima, and where $v^i(t)$ is the velocity vector at time t of the ith agent and $c_1$ and $c_2$ are parameters that weight the influence of their respective terms in the possibilistic velocity update technique, where w is a decay constant, and where the rand( ) function generates a random number.

2. An object recognition system incorporating swarming domain classifiers as set forth in claim 1, wherein the velocity vector changes towards pbest and gbest in a probabilistic way according to the following velocity update technique:

$$v^i(t)=wv^i(t-1)+c_1*rand()*(pbest-x^i(t-1))+c_2*rand()*(gbest-x^i(t-1))x^i(t)=x^i(t-1)+v^i(t),$$

where $x^i(t)$ and $v^i(t)$ are the position and velocity vectors at time t of the ith agent and $c_1$ and $c_2$ are parameters that weight the influence of their respective terms in the velocity update technique, where w is a decay constant, and where the rand( ) function generates a random number, whereby each agent in the plurality of agents changes its velocity in accordance with a combination of gbest and pbest, thereby allowing the swarm to concentrate in the vicinity of the object to quickly classify the object.

3. An object recognition system incorporating swarming domain classifiers as set forth in claim 2, further comprising a sequential niching module communicatively connected with the particle swarm optimization module for finding multiple objects in the domain, the sequential niching module configured to:
clear object positions from an object position list and a flag table;
initialize and run the cooperative swarm through a number of iterations until the gbest is greater than a preset value, or a number of iterations has reached a preset maximum number of allowable iterations;
if the gbest is not greater than the preset value or the number of iterations has reached a present maximum number, receive a next input domain;
if the gbest is greater than the preset threshold, then run a neighborhood test around the gbest position to verify if a certain number of neighboring positions in the domain also exceed the preset value;
if the gbest passes the neighborhood test;
add the gbest position to the object position list;
erase the domain locally at gbest with a predetermined function;
update the flag table;
re-initialize and run the swarm until gbest is greater than the preset value or the number of iterations has reached a preset maximum number of allowable iterations; and
if the gbest fails the neighborhood test;
re-initialize and run the swarm until gbest is greater than the preset value or the number of iterations has reached a maximum number of allowable iterations.

4. An object recognition system incorporating swarming domain classifiers as set forth in claim 3, wherein the object position list is a list of previously identified objects.

5. An object recognition system incorporating swarming domain classifiers as set forth in claim 4, wherein the flag table is a table with identical dimensions as the domain and is in a one-to-one correspondence with the domain, where all table entries are initially set to an "OFF" position and when an object is identified and erased from the domain, the corresponding table entry is updated from the "OFF" to an "ON" position, whereby if an agent lands on a location whose flag is set to "ON," the agent will not run its classifier since it is already known that an object is present at that location.

6. An object recognition system incorporating swarming domain classifiers as set forth in claim 5, wherein the predetermined function is a function selected from a group consisting of a Gaussian function and a Rect function.

7. An object recognition system incorporating swarming domain classifiers as set forth in claim 6, wherein the domain is a domain selected from a group consisting of an image, space, frequency, time, Doppler shift, time delay, wave length, and phase.

8. An object recognition system incorporating swarming domain classifiers as set forth in claim 7, further comprising a second cooperative swarm configured to search for members of a second object class, where each swarm maintains its own gbest, pbest, and object lists, and where the swarms interact indirectly through the erased domain and flag table, thereby if a swarm detects an object at a particular location in the domain, the other swarm does not try to find objects at the particular location.

9. An object recognition system incorporating swarming domain classifiers as set forth in claim 8, wherein each agent includes a classifier selected from a group consisting of Haar wavelet, fuzzy symmetry, decision tree, correlators, and a back-propagation neural network classification engine.

10. An object recognition system incorporating swarming domain classifiers as set forth in claim 9, wherein the multi-dimensional solution space consists of the dimensions (x, y, z), size, scale, internal classifier parameters, object rotation angle, and time.

11. An object recognition system incorporating swarming domain classifiers as set forth in claim 10, wherein the domain is a domain selected from a group consisting of an image, space, frequency, time, Doppler shift, time delay, wave length, and phase.

12. An object recognition system incorporating swarming domain classifiers as set forth in claim 11, wherein each agent includes a classifier selected from a group consisting of Haar wavelet, fuzzy symmetry, decision tree, correlators, and a back-propagation neural network classification engine.

13. An object recognition system incorporating swarming domain classifiers as set forth in claim 12, wherein the multi-dimensional solution space consists of the dimensions (x, y, z), size, scale, internal classifier parameters, object rotation angle, and time.

14. An object recognition system incorporating swarming domain classifiers as set forth in claim 1, wherein the domain is a domain selected from a group consisting of an image, space, frequency, time, Doppler shift, time delay, wave length, and phase.

15. An object recognition system incorporating swarming domain classifiers as set forth in claim 14, wherein each agent includes a classifier selected from a group consisting of Haar wavelet, fuzzy symmetry, decision tree, correlators, and a back-propagation neural network classification engine.

16. An object recognition system incorporating swarming domain classifiers as set forth in claim 14, wherein the multi-dimensional solution space consists of the dimensions (x, y, z), size, scale, internal classifier parameters, object rotation angle, and time.

17. An object recognition system incorporating swarming domain classifiers as set forth in claim 1, wherein the plurality of agents constitute a sequential niching module for finding multiple objects in the domain, the sequential niching module configured to:
clear object positions from an object position list and a flag table;
initialize and run the cooperative swarm through a number of iterations until the gbest is greater than a preset value, or the number of iterations has reached a preset maximum number of allowable iterations;
if the gbest is not greater than the preset value or the number of iterations has reached a present maximum number, receive a next input domain;

if the gbest is greater than the preset threshold, then run a neighborhood test around the gbest position to verify if a certain number of neighboring positions in the domain also exceed the preset value;
   if the gbest passes the neighborhood test;
      add the gbest position to the object position list;
      erase the domain locally at gbest with a predetermined function;
      update the flag table;
      re-initialize and run the swarm until gbest is greater than the preset value or the number of iterations has reached a preset maximum number of allowable iterations; and
   if the gbest fails the neighborhood test;
      re-initialize and run the swarm until gbest is greater than the preset value or the number of iterations has reached a maximum number of allowable iterations.

18. An object recognition system incorporating swarming domain classifiers as set forth in claim 17, wherein the object position list is a list of previously identified objects.

19. An object recognition system incorporating swarming domain classifiers as set forth in claim 18, wherein the flag table is a table with identical dimensions as the domain and is in a one-to-one correspondence with the domain, where all table entries are initially set to an "OFF" position and when an object is identified and erased from the domain, the corresponding table entry is updated from the "OFF" to an "ON" position, whereby if an agent lands on a location whose flag is set to "ON," the agent will not run its classifier since it is already known that an object is present at that location.

20. An object recognition system incorporating swarming domain classifiers as set forth in claim 19, wherein the predetermined function is a function selected from a group consisting of a Gaussian function and a Rect function.

21. An object recognition system incorporating swarming domain classifiers as set forth in claim 20, wherein the domain is a domain selected from a group consisting of an image, space, frequency, time, Doppler shift, time delay, wave length, and phase.

22. An object recognition system incorporating swarming domain classifiers as set forth in claim 21, further comprising a second cooperative swarm configured to search for members of a second object class, where each swarm maintains its own gbest, pbest, and object lists, and where the swarms interact indirectly through the erased domain and flag table, thereby if a swarm detects an object at a particular location in the domain, the other swarm does not try to find objects at the particular location.

23. An object recognition system incorporating swarming domain classifiers as set forth in claim 22, wherein each agent includes a classifier selected from a group consisting of Haar wavelet, fuzzy symmetry, decision tree, correlators, and a back-propagation neural network classification engine.

24. An object recognition system incorporating swarming domain classifiers as set forth in claim 23, wherein the multi-dimensional solution space consists of the dimensions (x, y, z), size, scale, internal classifier parameters, object rotation angle, and time.

25. A method for object recognition incorporating swarming domain classifiers, the method comprising acts of:
   initializing, in a processor, an agent swarm for N objects to perform at least one iteration on a domain;
   evaluating agent classifiers at each agent's location by running the agent swarm to determine a classification value for the domain at each agent's location;
   computing possibilistic memberships;
   determining if the number of iterations is less than a predetermined value;
      if the number of iterations is less than the predetermined value, then updating the agent position and velocity according to a velocity update technique;
      if the number of iterations is greater than the predetermined value, then updating the agent positions and velocity according to a possibilistic update technique;
   determining if the number of iterations has reached a predetermined maximum number of iterations;
      if the number of iterations is greater than or equal to the predetermined maximum number of iterations, then loading a new domain into the swarming domain classifier;
      if the number of iterations is less than the predetermined number of iterations, then continue running the swarming domain classifier on the domain at the step for evaluating agent classifiers at each location by running the classifier to determine a classification value for the domain at each agent's location; and wherein in the act of computing possibilistic memberships, possibilistic memberships are calculated according to the following:

$$\mu_{ij} = \frac{\eta_j}{\eta_j + d_{ij}^2},$$

where $\eta_j$ is a dynamic elastic constraint around the jth minima, and $$d_{ij}^2$$

is the distance of an ith agent to a jth minima, and where initially $\eta_j$ is unbounded and it is slowly decreased to a small region around the local minima.

26. A method for object recognition incorporating swarming domain classifiers as set forth in claim 25, wherein in the act of updating the agent positions and velocity according to a possibilistic update technique, the possibilistic update technique is calculated according to the following:

$$v^i(t) = wv^i(t-1) + c_1 * rand() * (pbest - x^i(t-1)) + c_2 * rand() * \sum_{j=1}^{C} \mu_{ij}(gbest^j - x^i(t-1)),$$

where $v^i(t)$ is the velocity vector at time t of the ith agent and $c_1$ and $c_2$ are parameters that weight the influence of their respective terms in the possibilistic velocity update technique, where w is a decay constant, and where the rand( ) function generates a random number, and gbest is used to store a best location among all agents, and pbest is an observed best solution that the agent has identified.

27. A method for object recognition incorporating swarming domain classifiers as set forth in claim 26, wherein in the act of updating the agent position and velocity according to a velocity update technique, the velocity update technique is calculated according to the following;

$$v^i(t) = wv^i(t-1) + c_1 * rand()*(pbest - x^i(t-1)) + c_2 * rand()*(gbest - x^i(t-1))x^i(t) = x^i(t-1) + v^i(t),$$

where $x^i(t)$ and $V^i(t)$ are the position and velocity vectors at time t of the ith agent and $c_1$ and $c_2$ are parameters that weight the influence of their respective terms in the velocity update technique, where w is a decay constant, and where the rand( ) function generates a random number.

28. A method for object recognition incorporating swarming domain classifiers as set forth in claim 25, wherein in the act of updating the agent position and velocity according to a velocity update technique, the velocity update technique is calculated according to the following;

$$v^i(t) = wv^i(t-1) + c_1 * rand(\ ) * (pbest - x^i(t-1)) + c_2 * rand(\ ) * (gbest - x^i(t-1)) x^i(t) = x^i(t-1) + v^i(t),$$

where $x^i(t)$ and $v^i(t)$ are the position and velocity vectors at time t of the ith agent and $c_1$ and $c_2$ are parameters that weight the influence of their respective terms in the velocity update technique, where w is a decay constant, and where the rand( ) function generates a random number, and gbest is used to store a best location among all agents, and pbest is an observed best solution that the agent has identified.

29. A method for object recognition incorporating swarming domain classifiers as set forth in claim 28, wherein in the act of updating the agent positions and velocity according to a possibilistic update technique, the possibilistic update technique is calculated according to the following:

$$v^i(t) = wv^i(t-1) + c_1 * rand(\ ) * (pbest - x^i(t-1)) + c_2 * rand(\ ) * \sum_{j=1}^{C} \mu_{ij}(gbest^j - x^i(t-1)),$$

where $v^i(i)$ is the velocity vector at time t of an ith agent and $c_1$ and $c_2$ are parameters that weight the influence of their respective terms in the possibilistic velocity update technique, where w is a decay constant, and where the rand( ) function generates a random number.

30. A method for object recognition incorporating swarming domain classifiers, the method comprising acts of:
    clearing object positions from an object position list and a flag table;
    initializing and running, on a processor, a cooperative swarm through a number of iterations until a gbest is greater than a preset threshold, or the number of iterations has reached a preset maximum number of allowable iterations, where gbest is used to store a best location among all agents;
    if the gbest is not greater than the preset threshold or the number of iterations has reached a present maximum number, receiving a next input domain;
    if the gbest is greater than the preset threshold, then running a neighborhood test around the gbest position to verify if a certain number of neighboring positions in the domain also exceed the preset threshold;
    if the gbest passes the neighborhood test, then;
        adding the gbest position to the object position list;
        erasing the domain locally at gbest with a predetermined function;
        updating the flag table;
        re-initializing and running the swarm until gbest is greater than the preset threshold or the number of iterations has reached a preset maximum number of allowable iterations;
    if the gbest fails the neighborhood test, then;
        re-initializing and running the swarm until gbest is greater than the preset threshold or the number of iterations has reached a maximum number of allowable iterations.

31. A computer program product for object recognition, comprising means stored on a computer readable medium, for:
    initializing an agent swarm for N objects;
    evaluating agent classifiers at each agent's location by running the classifier to determine a classification value for a domain at each agent's location;
    computing possibilistic memberships; determining if the number of iterations is less than a predetermined value;
        if the number of iterations is less than the predetermined value, then updating the agent position and velocity according to a velocity update technique;
        if the number of iterations is greater than the predetermined value, then updating the agent positions and velocity according to a possibilistic update technique;
    determining if the number of iterations has reached a predetermined maximum number of iterations;
        if the number of iterations is greater than or equal to the predetermined maximum number of iterations, then loading a new domain into the swarming domain classifier;
        if the number of iterations is less than the predetermined number of iterations, then continue running the swarming domain classifier on the domain at the step for evaluating agent classifiers at each location by running the classifier to determine a classification value for the domain at each agent's locations; and
    wherein the means for computing possibilistic memberships further comprises a means for computing the possibilistic memberships according to the following:

$$\mu_{ij} = \frac{\eta_j}{\eta_j + d_{ij}^2},$$

where $\eta_j$ is a dynamic elastic constraint around the jth minima, and $$d_{ij}^2$$

is the distance of an ith agent to a jth minima, and where initially $\eta_j$ is unbounded and it is slowly decreased to a small region around the local minima.

32. A computer program product for object recognition as set forth in claim 31, wherein in the means for updating the agent positions and velocity according to a possibilistic update technique, the possibilistic update technique is calculated according to the following:

$$v^i(t) = wv^i(t-1) + c_1 * rand(\ ) * (pbest - x^i(t-1)) + c_2 * rand(\ ) * \sum_{j=1}^{C} \mu_{ij}(gbest^j - x^i(t-1)),$$

and where $v^i(t)$ is the velocity vector at time t of an ith agent and $c_1$ and $c_2$ are parameters that weight the influence of their respective terms in the possibilistic velocity update technique, where w is a decay constant, and where the rand( ) function generates a random number, and where gbest is used to store a best location among all agents, and pbest is an observed best solution that the agent has identified.

33. A computer program product for object recognition as set forth in claim 32, wherein in the means for updating the agent position and velocity according to a velocity update technique, the velocity update technique is calculated according to the following;

$$v^i(t)=wv^i(t-1)+c_1*rand(\ )*(pbest-x^i(t-1))+c_2*rand(\ )*(gbest-x^i(t-1))x^i(t)=x^i(t-1)+v^i(t),$$

where $x^i(t)$ and $v^i(t)$ are the position and velocity vectors at time t of an ith agent and $c_1$ and $c_2$ are parameters that weight the influence of their respective terms in the velocity update technique, where w is a decay constant, and where the rand( ) function generates a random number.

34. A computer program product for object recognition as set forth in claim 31, wherein in the means for updating the agent position and velocity according to a velocity update technique, the velocity update technique is calculated according to the following;

$$v^i(t)=wv^i(t-1)+c_1*rand(\ )*(pbest-x^i(t-1))+c_2*rand(\ )*(gbest-x^i(t-1))x^i(t)=x^i(t-1)+v^i(t),$$

where $x^i(t)$ and $v^i(t)$ are the position and velocity vectors at time t of an ith agent and $c_1$ and $c_2$ are parameters that weight the influence of their respective terms in the velocity update technique, where w is a decay constant, and where the rand( ) function generates a random number, and where gbest is used to store a best location among all agents, and pbest is an observed best solution that the agent has identified.

35. A computer program product for object recognition as set forth in claim 34, wherein in the means for updating the agent positions and velocity according to a possibilistic update technique, the possibilistic update technique is calculated according to the following:

$$v^i(t) = wv^i(t-1) + c_1 * rand(\ ) * (pbest - x^i(t-1)) + c_2 * rand(\ ) * \sum_{j=1}^{C} \mu_{ij}(gbest^j - x^i(t-1)),$$

and where $v^i(t)$ is the velocity vector at time t of an ith agent and $c_1$ and $c_2$ are parameters that weight the influence of their respective terms in the possibilistic velocity update technique, where w is a decay constant, and where the rand( ) function generates a random number.

36. A computer program product for object recognition, comprising means stored on a computer readable medium, for:

clearing object positions from an object position list and a flag table;

initializing and running a cooperative swarm through a number of iterations until a gbest is greater than a preset threshold, or the number of iterations has reached a preset maximum number of allowable iterations, where gbest is used to store a best location among all agents;

if the gbest is not greater than the preset threshold or the number of iterations has reached a present maximum number, receiving a next input domain;

if the gbest is greater than the preset threshold, then running a neighborhood test around the gbest position to verify if a certain number of neighboring positions in the domain also exceed the preset threshold;

if the gbest passes the neighborhood test, then;

adding the gbest position to the object position list;

erasing the domain locally at gbest with a predetermined function;

updating the flag table;

re-initializing and running the swarm until gbest is greater than the preset threshold or the number of iterations has reached a preset maximum number of allowable iterations;

if the gbest fails the neighborhood test, then;

re-initializing and running the swarm until gbest is greater than the preset threshold or the number of iterations has reached a maximum number of allowable iterations.

* * * * *